US010587601B2

(12) United States Patent
Wyn-Harris

(10) Patent No.: US 10,587,601 B2
(45) Date of Patent: *Mar. 10, 2020

(54) AUTOMATED IDENTITY ASSESSMENT METHOD AND SYSTEM

(71) Applicant: 3FISH LIMITED, Christchurch (NZ)

(72) Inventor: Jeremy Wyn-Harris, Christchurch (NZ)

(73) Assignee: 3FISH LIMITED, Christchurch (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,209

(22) Filed: Jan. 17, 2019

(65) Prior Publication Data
US 2019/0149534 A1 May 16, 2019

Related U.S. Application Data

(63) Continuation of application No. 15/912,095, filed on Mar. 5, 2018, now Pat. No. 10,230,713, which is a (Continued)

(30) Foreign Application Priority Data

Aug. 2, 2010 (NZ) .................................. 584335
Dec. 24, 2010 (NZ) .................................. 590227
Mar. 30, 2011 (NZ) .................................. 592029

(51) Int. Cl.
H04L 29/06 (2006.01)
G06F 21/31 (2013.01)
(Continued)

(52) U.S. Cl.
CPC .............. *H04L 63/08* (2013.01); *G06F 21/31* (2013.01); *G06F 21/316* (2013.01); *G06F 21/36* (2013.01);
(Continued)

(58) Field of Classification Search
CPC ....... H04L 63/08; H04L 63/102; H04L 63/12; H04L 65/403; H04L 67/306; G06F 21/31; G06F 21/316; G06F 21/36
See application file for complete search history.

(56) References Cited

U.S. PATENT DOCUMENTS 5,430,827 A 7/1995 Rissanen
5,737,491 A 4/1998 Allen et al.
(Continued)

FOREIGN PATENT DOCUMENTS

WO 2004/008284 A2 1/2004

*Primary Examiner* — Kambiz Zand
*Assistant Examiner* — Tongoc Tran
(74) *Attorney, Agent, or Firm* — Stephen M. De Klerk

(57) ABSTRACT

A method, system and software for assessing an entity (15) at a first user terminal (13) connected to a data network (10). A control system (11) is used to receive an access request (101) from the entity (15) or an assessing user (16) at a second user terminal (14). The control system (11) invokes or facilitates transmission of a time-delimited sequence of unpredictable prompts (18) to the entity (15) for a performance of visible prompted actions (20). A video recording (21) of the prompted action performance is stored in a data store (61) and the control system performs an automated assessment of the video recording (21) by a gesture recognition system (67d) and generates an assessment signal respectively including a positive or negative indication of whether or not said entity (15) validly performed said prompted actions.

20 Claims, 11 Drawing Sheets

Related U.S. Application Data continuation of application No. 15/426,359, filed on Feb. 7, 2017, now Pat. No. 9,917,826, which is a continuation of application No. 14/749,631, filed on Jun. 24, 2015, now Pat. No. 9,602,495, which is a continuation of application No. 13/813,424, filed as application No. PCT/IB2011/053429 on Aug. 2, 2011, now Pat. No. 9,122,851.

(51) Int. Cl.
*G06F 21/36* (2013.01)
*H04L 29/08* (2006.01)

(52) U.S. Cl.
CPC ........ H04L 63/0861 (2013.01); H04L 63/102 (2013.01); H04L 63/12 (2013.01); H04L 65/403 (2013.01); H04L 67/306 (2013.01)

(56) References Cited

U.S. PATENT DOCUMENTS

| | | |
|---|---|---|
| 5,870,744 A | 2/1999 | Sprague |
| 5,905,736 A | 5/1999 | Ronen et al. |
| 6,167,469 A | 12/2000 | Safai et al. |
| 6,226,752 B1 | 5/2001 | Gupta et al. |
| 6,269,481 B1 | 7/2001 | Perlman |
| 6,421,453 B1 | 7/2002 | Kanevsky et al. |
| 6,636,259 B1 | 10/2003 | Anderson et al. |
| 6,654,459 B1 | 11/2003 | Bala et al. |
| 6,910,129 B1 | 6/2005 | Deng |
| 6,941,001 B1 | 9/2005 | Bole |
| 6,957,337 B1 | 10/2005 | Chainer |
| 6,957,339 B2 | 10/2005 | Shinzaki |
| 6,992,562 B2 | 1/2006 | Fuks |
| 7,027,617 B1 | 4/2006 | Frischholz |
| 7,039,812 B2 | 5/2006 | Kawan |
| 7,130,452 B2 | 10/2006 | Bolle |
| 7,178,025 B2 | 2/2007 | Scheidt |
| 7,278,024 B2 | 10/2007 | Sundararajan |
| 7,373,515 B2 | 5/2008 | Owen |
| 7,545,963 B2 | 6/2009 | Rowe |
| 7,689,832 B2 | 3/2010 | Talmor et al. |
| 7,735,729 B2 | 6/2010 | Rowe |
| 7,810,143 B2 | 10/2010 | Ruzyski et al. |
| 7,813,822 B1* | 10/2010 | Hoffberg ............ G06K 9/00369 381/73.1 |
| 8,245,052 B2 | 8/2012 | Bjorn |
| 8,508,338 B1 | 8/2013 | Fiddy |
| 2003/0018897 A1 | 1/2003 | Bellis et al. |
| 2003/0046083 A1 | 3/2003 | Devinney et al. |
| 2003/0046237 A1 | 3/2003 | Uberti |
| 2003/0135740 A1 | 7/2003 | Talmor et al. |
| 2003/0154406 A1 | 8/2003 | Honarvar et al. |
| 2004/0064415 A1 | 4/2004 | Abdallah et al. |
| 2004/0104266 A1 | 6/2004 | Bolle et al. |
| 2004/0229560 A1 | 11/2004 | Maloney |
| 2005/0240779 A1 | 10/2005 | Aull |
| 2007/0008108 A1 | 1/2007 | Schurig et al. |
| 2007/0165911 A1 | 7/2007 | Baentsch |
| 2007/0192798 A1 | 8/2007 | Morgan |
| 2007/0203850 A1 | 8/2007 | Singh et al. |
| 2008/0040692 A1 | 2/2008 | Sunday et al. |
| 2008/0068187 A1 | 3/2008 | Bonefas et al. |
| 2008/0143895 A1 | 6/2008 | Peterka et al. |
| 2008/0170776 A1 | 7/2008 | Albertson et al. |
| 2009/0083841 A1 | 3/2009 | Gierach |
| 2009/0259588 A1 | 10/2009 | Lindsay |
| 2009/0274339 A9 | 11/2009 | Cohen et al. |
| 2010/0070861 A1 | 3/2010 | Meier et al. |
| 2010/0115114 A1 | 5/2010 | Headley |
| 2010/0131273 A1 | 5/2010 | Aley-Raz et al. |
| 2010/0169792 A1 | 7/2010 | Ascar et al. |
| 2010/0198608 A1* | 8/2010 | Kaboff .................. G06Q 10/00 705/2 |
| 2010/0313028 A1 | 12/2010 | Li |
| 2011/0047237 A1 | 2/2011 | Walsh et al. |
| 2011/0102142 A1* | 5/2011 | Widger .................... G09B 5/06 340/5.83 |
| 2011/0112901 A1* | 5/2011 | Fried ...................... G06Q 30/02 705/14.49 |
| 2011/0164143 A1 | 7/2011 | Shintani et al. |
| 2011/0225286 A1 | 9/2011 | Francis et al. |
| 2011/0274318 A1* | 11/2011 | Shindo ............... G06K 9/00382 382/115 |
| 2012/0249328 A1 | 10/2012 | Xiong |
| 2013/0021249 A1 | 1/2013 | Bedworth |
| 2014/0101740 A1 | 4/2014 | Li et al. |

* cited by examiner

This will take a short video of you and prompt you to perform a series of random actions. Please give this application permission to use your web camera.

View Clips

AUTOMATED IDENTITY ASSESSMENT METHOD AND SYSTEM

CROSS-REFERENCE TO OTHER APPLICATIONS

This is a continuation of U.S. patent application Ser. No. 15/912,095, filed on Mar. 5, 2018, which is a continuation of U.S. patent application Ser. No. 15/426,359, filed on Feb. 7, 2017 now U.S. Pat. No. 9,917,826, which is a continuation of U.S. patent application Ser. No. 14/749,631, filed on Jun. 24, 2015 now U.S. Pat. No. 9,602,495, which is a continuation of U.S. patent application Ser. No. 13/813,424, filed on Jan. 30, 2013 now U.S. Pat. No. 9,122,851, which is a National phase of international application No. PCT/IB2011/053429, filed on Aug. 2, 2011, which claims priority from New Zealand patent application No. 584335, filed Aug. 2, 2010, New Zealand patent application No. 590227, filed Dec. 24, 2010, and 592029, filed Mar. 30, 2011, all of which are incorporated herein by reference in their entirety.

TECHNICAL FIELD

The present invention relates to user identity assessment methods and systems.

BACKGROUND ART

Distributed communication technology has rapidly advanced as its benefits in business, government and other human endeavours become ever more apparent. Teleconferencing and videoconferencing is used frequently in business, government, military, education and other professional and non-professional organizations as a means for providing communication between separated individuals. The use of videoconferencing has also become a commonplace facet in the personal life of many users, communicating via video-link over the internet, mobile phone or other networks.

In particular, the use of internet and mobile social networks as a means of communication between individuals has rapidly increased in popularity. In an increasing proportion of users, social networks have become the primary means of communication with people outside the users' immediate physical vicinity. Social networks offer a method of communication that benefits many users. However, social networks have also been abused by criminals and other malicious individuals to harm other users through deceitful practices such as the use of false or misleading identities. Malicious users may portray themselves to be another person to solicit money from another user or to deceive vulnerable individuals into a personal meeting for nefarious purposes.

As used herein, the term "social network" can be interpreted include the now ubiquitous social networks such as Facebook™ and LinkedIn™, as well as any networks created indirectly through collaboration in online gaming, online forums, relationship facilitation services (e.g. 'dating sites'), virtual 'worlds' and similar formal and informal networks.

Such social networking sites allow people to interact with each other online using:
their own true identity,
an alias that may or may not be tied to their real identity, or
a false identity.

The use of aliases or false identities can often be harmless and even overt, e.g. as in gaming applications. However, aliases or false identities can also cause problems as they provide the ability for dishonest people to assume an identity in order to conceal, deceive, or mislead others in some way. This deception can be used to gain trust of vulnerable individuals (for example young people or children) whom would not usually interact with people outside their age group, especially on issues of personal relationships or finances. Similarly, on interpersonal dating sites it is possible for members to have profile pictures that are not accurate representations or may even be of another person entirely. Thus, other users are deceived as to the true identity of the other person.

Social networking accounts may also be hijacked by criminals and used to discredit the reputation of the legitimate owner or analyzed to extract sensitive information from the legitimate owner's account or their contacts.

While passwords may provide some level of security, many users are incautious with password security and often use simplistic, easily guessed passwords.

Typical network assessment methods rely on a simple text-based user-ID and password combination to verify an entity as an authorised user. However, such a text-based system of authentication provides no means for an assessing user to verify that an entity has not compromised the authorised user's account.

Using text as a means of communication in Social networks also does not provide visual verification of the registered user, thus providing a means for presenting a fraudulent persona to other users, e.g. a paedophile may create a network account with false details and pictures and thereby present themselves as having a different appearance or being the same age as potential victims. Although more difficult to achieve than in text-based communication, users can also be deceived by voice impersonations in audio communication.

It will be apparent that people may communicate using conventional video communication which reduces the possibility of deception, i.e. the assessing user can compare the video images of the entity to the authorised user's profile picture or their own personal knowledge. However, many people prefer not to use live video communication for a variety of reasons, including maintaining a level of privacy during their online interactions, or not wanting others to see their facial expressions and body language during communication. Hence text-based communication has proved by far more popular than video communication on data networks.

While other complex authentication methods may be used, e.g. biometric scanning, retina recognition, these systems generally require specialised hardware and/or software which may not be available or practical to many applications. Thus, numerous authentication systems have been devised to foil or at least hinder unauthorised hijacking of user accounts. Examples of common advanced authentication systems include:

character recognition systems to stop automated hacking by computer software;
multiple sequences of user-specific questions, e.g. "what city were you born in?"
physical code sheets or the like, typically sent to the user's verified address from which a code is requested by the network to authenticate the user;
physical code generator devices time-synchronised with the network;

However, none of these systems are fail-safe as they all rely on the user taking precautions to avoid using common, easy to remember answers or preventing theft of the physical code devices.

Such systems also do not help in social networks or relationship facilitation services (e.g. online 'dating' networks) where users can simply set up a user account with a false identity and credentials. Although traditional methods of authenticating users, e.g. through background vetting, photo-ID comparisons or the like have been widely employed in the past, such methods are expensive and impractical for most social networks. Users of social networks may be distributed in numerous different countries, with differing privacy laws which may preclude vetting assessments.

Thus, there are generally two major risks associated with communication over existing communication networks.

Firstly, there is a risk that an unauthorised entity obtains access to another user's network account or device and then communicates with other users who mistakenly believe the imposter is in fact genuine.

Secondly, there is a risk a fraudulent entity would create a network account or profile with false details, thereby providing a means to deceive other.

It would thus be advantageous to provide a method and system for improved authentication/assessment for users in accessing secure data, data networks and remote communication with other users.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to a first aspect of the present invention there is provided a method of assessing an entity at a first user terminal connected to a data network, said method utilising a control system operable to perform the steps of:
  a) receiving an access request from at least one of:
    said entity;
    an assessing user at a second user terminal connected to the data network;
  b) invoking or facilitating transmission of at least one unpredictable prompt to said entity for a performance of a visible prompted action;
  c) invoking storage of at least one video recording of said prompted action performance from said entity in a data store;
  d) performing:
    an automated assessment of said video recording; and/or
    an invocation or facilitation of a transmission of said video recording from said data store and details of said prompt to a second user terminal for viewing and assessment by an assessing user.

Preferably, said control system receives an assessment signal from said assessing user and/or from said automated assessment.

Preferably, steps b) and c) are performed synchronously.

According to a second aspect of the present invention, there is provided a method of assessment of an entity at a first user terminal connected to a data network, said assessment performed by an assessing user at a second user terminal connected to the data network, the control system operable to perform the steps of:
  a) receiving an access request from said entity or said assessing user,
  b) invoking or facilitating transmission of at least one unpredictable prompt to said entity to perform a visible prompted action;
  c) invoking storage of at least one video recording of said prompted action performance from said entity in a data store;
  d) invoking or facilitating transmission of said video recording from said data store and details of said prompt to said second user terminal for viewing and assessment by said assessing user,
  e) receiving from said assessing user an assessment signal.

According to a third aspect of the present invention, there is provided a control system for facilitating entity assessment of an entity at a first user terminal connected to a data network, said control system including a computer system with a computer processor coupled to a system memory and programmed with computer readable instructions executable to perform the following procedures:
  a) receiving and processing data relating to an access request from at least one of:
    said entity;
    an assessing user at a second user terminal connected to the data network;
  b) invoking or facilitating transmission of at least one unpredictable prompt for said entity to perform a visible prompted action;
  c) invoking storage of at least one video recording of said prompted action performance from said entity in a data store;
  d) performing:
    an automated assessment of said video recording; and/or
    invocation or facilitation of transmission of said video recording from said data store and details of said prompt to an second user terminal for viewing and assessment by an assessing user.

According to a fourth aspect of the present invention there is provided a control system for enabling entity assessment of an entity at a first user terminal connected to a data network, said assessment performed by an assessing user at a second user terminal connected to the data network, said control system including a computer system with a computer processor coupled to a system memory and programmed with computer readable instructions executable to perform the following procedures:
    a) receiving and processing data relating to an access request from said entity or said assessing user
    b) invoking or facilitating transmission of at least one unpredictable prompt to said entity to perform a visible prompted action;
    c) invoking storage of at least one video recording of said prompted action performance from said entity in a data store;
    d) invoking or facilitating transmission of said video recording from said data store and details of said prompt to said second user terminal for viewing and assessment by said assessing user,
    e) receiving from said assessing user an assessment signal.

According to a fifth aspect of the present invention, there is provided computer software for enabling entity assessment of an entity at a first user terminal connected to a data network, said computer software embodied in computer-readable instructions executable to perform the following procedures:
    a) processing data relating to an access request from at least one of:
      said entity;
      an assessing user at a second user terminal connected to the data network;
    b) invoking or facilitating transmission of at least one unpredictable prompt to said entity to perform a visible prompted action;
    c) invoking storage of at least one video recording of said prompted action performance from said entity in a data store;
    d) performing:
      an automated assessment of said video recording; and/or
      invoking or facilitating transmission of said video recording from said data store and details of said prompt to a second user terminal for viewing and assessment by an assessing user.

According to a sixth aspect of the present invention there is provided computer software for enabling assessment of an entity at a first user terminal connected to a data network, said assessment performed by an assessing user at a second user terminal connected to the data network, said computer software embodied in computer-readable instructions executable to perform the following procedures:
    a) receiving and processing data relating to an access request from said entity or said assessing user
    b) invoking or facilitating transmission of at least one unpredictable prompt for said entity to perform a visible prompted action;
    c) invoking storage of at least one video recording of said prompted action performance from said entity in a data store;
    d) invoking or facilitating transmission of said video recording from said data store and details of said prompt to said second user terminal for viewing and assessment by said assessing user,
    e) receiving and processing an assessment signal received from said assessing user.

As used herein, the term "entity" should be understood to refer to any person, organisation or virtual entity.

A "user", as referred to herein is any entity accessing the data network, including "registered users" and "unregistered users".

A "registered user", as referred to herein is a user of the data network that has a set of identifying characteristics (and preferably other user details) stored in one or more related user records collectively forming a "user account" in a database in a data store accessible by the control system. Axiomatically, an "unregistered user" is a user that has no such credentials or account but otherwise has some form of access to the first user terminal and/or data network.

The term "Identifying characteristics" as used herein refers to any characteristic of an entity that can be used to identify the entity, either singly or in combination with other characteristics. Exemplary identifying characteristics include name, gender, age, occupation, country-of-residence, nationality, profile image/photo, height, hair colour, eye colour, educational, sporting and health history and the like.

A "persona" as used herein refers to the aspect of an entity's character that is portrayed to or perceived by the assessing user. The identifying characteristics of a user account may collectively act as a "persona" portraying a user or other entity. Additionally, a persona may be provided by external sources, e.g. famous persons may have an associated persona but may not be a user of the data network.

The "prompt" provided to the entity is unpredictable so that a believable pre-prepared response cannot be fabricated by an imposter.

It will be appreciated that reference herein to "unpredictable" prompts should also be understood to include random and pseudo-random prompts or any predetermined non-random selection of a prompt that prevents the entity from knowing which prompt will be provided.

As used herein, the term "data network" should be understood to refer to any electronic network having a control system capable of receiving and transmitting data from user terminals. A data network may thus be considered to include virtual private networks (VPN), the internet, telephone/cellular networks, local area (LAN), wide area (WAN), wireless, WIFI, satellite, radio, UHF, VHF, infrared, mesh networks, Bluetooth, ZigBee or any other network having one or more control systems and connected terminals.

The data network preferably includes a "virtual network" formed from connections between multiple users connected to the data network. Examples of virtual networks include: social networks, gaming, banking/financial, relation facilitation services (e.g. dating websites), government, commercial, organisational, military, academic, entertainment or the like. Typical "virtual networks" are normally embodied in related data records in a database. Each data record preferably corresponds to a registered user or a user terminal and groups of data records relating to the same registered user or user terminal form a "user account".

Preferably, said virtual network may include a relationship facilitation service for allowing users to communicate with each other for the purposes of forming a relationship, e.g. a 'dating' or 'matching' service.

As used herein, the term "user terminal" refers to any device or collection of devices, at least one of which is capable of connecting to the control system to communicate on the data network and by way of example, includes a computer, mobile computing device, cellular phone, e-reader, tablet, PDA, games console, or combinations thereof. The user terminal may also be embodied in separate devices, e.g. a display capable of receiving data as well as a separate, distinct computer device for transmitting data.

It should be appreciated that the entity and assessing user may be located at the same user terminal at different time periods or may be at different user terminals, whether in the same location or remote to each other, thus the 'first user terminal' may be the same as the 'second user terminal' in some circumstances and therefore it should be appreciated that reference herein to a "second user terminal" can be interpreted to include the "first user terminal" and vice versa.

The control system is preferably a computer server and/or system configured to receive and process the access request from a user terminal. It will be appreciated that the control system may comprise multiple distributed computing resources. Preferably, the control system may include a "cloud-computing" based system. As used herein, the term "cloud-computing" refers to a computing capability that provides an abstraction between the computing resource and its underlying technical architecture (e.g., servers, storage and networks), enabling on-demand network access to a group of configurable computing resources.

It should be appreciated that the control system may have system memory and a processor for executing software. It should be appreciated that these computing resources need not be in the same location, e.g. the control system may be a virtual system using 'cloud-computing' resources with distributed processors, software and memory resources.

Preferably, where the data network includes an internet social network, said control system may include one or more social network servers and a database.

In addition the data network may be connected to a third party or remote control system capable of sending and receiving data from the data network.

As used herein the term "access request" may refer to any request for "access" to data, a virtual network, communication with users, or to the data network itself and includes, but is not limited to direct or indirect:
  access to the data network;
  access, e.g. a to a virtual network e.g. a social network, relationship facilitation service, blog, chat-room, RSS feed, forum, data-sharing network or similar.
  access to publish information;
  access to a data resource;
  access to a user terminal, e.g. a log-in to a computer operating system;
  acceptance of a contract, e.g. a license, terms of use, purchase offer.
  access to communication with another user, e.g. sending of an instant message, e-mail, SMS message, dialling of phone number or VOIP network (e.g. Skype®) identifier;
  access to recover lost passwords or login information.

Preferably, the prompt is provided to the entity in conjunction with an access request provided in the form of a contract or offer of contract. The contract may be an agreement, deed, item, product, software, license, service, competition or any other application otherwise requiring a signature, agreement or the like. Thus, the video recording may be used as a video 'signature' or 'record' of acceptance, acknowledgement or rejection of the contract. Acceptance or acknowledgement of the contract may be indicated by performing the prompted visible actions correctly, and/or performing an action indicating acceptance, e.g. the prompt may include "make a 'thumbs-up' gesture if you agree to the terms of this license.

Preferably, the control system stores the contract and associated video recording in records related to the accessed user account or alternatively stores a record in the database linking the contract with the video recording. Thus, in the event of a dispute, the control system may retrieve the contract and associated video recording to allow assessment. The assessing user or automated assessment may thus be able to assess the video recording to determine that the entity was presented with the contract and indicated their acceptance or rejection. Thus, in some applications, the video recording may be used as a signature by which the entity can be identified.

In one embodiment of the present invention the first user terminal may be a user-operable device such as an operating system, vehicle, machinery or the like. Preferably, the access request is to access said user-operable device said entity is provided access to operate said user-operable device only if said control system classifies said entity positively. The user-operable device may thus be secured from unauthorised access or operation. The present invention may be used similarly to a security system to restrict access to an operating system, vehicle, machinery or the like, wherein the entity is assessed before being allowed to access or operate that system, vehicle or machinery.

The access request need not be received directly from the entity or assessing user and may instead be received via another user, entity, server, system, proxy or network.

Reference herein to "invoke", "invoking", "invoked" and "invocation" with respect to a procedure related to the control system should be understood to refer to any method, act or process for causing the relevant procedure to be carried out and includes:
  directly conducting the relevant procedure;
  generating and/or transmitting a signal or data that triggers the relevant procedure;
  generating and/or transmitting a signal or data to another system that performs the relevant procedure.

Reference herein to "facilitating transmission" should be interpreted to include generating and/or transmitting a signal or data that is used in transmission of data in and/or between a data store, the control system and/or user terminal.

The "visible prompted action" includes any body action that can be visually observed (and optionally verified) as occurring and by way of example, may include: facial gestures, hand and other body gestures. Body actions involving hands, face and other body parts are visible and normally ease recognisable and thus are particularly suited to the present invention. Accordingly, the visible prompted action preferably excludes typing, writing or other data input to the first user terminal.

To aid clarity and avoid prolixity, reference herein has been made to a single "video recording" being made, however, this should not be seen to be limiting and it should be understood that reference to a "video recording" in the singular also includes multiple recordings.

The video recording is referred to herein as being received from the first user terminal accessed by the entity. However, it should be appreciated that this recording may also be passed through intermediary servers, proxies, terminals, networks, routers or similar before reaching the control system and should not be seen to be limited to direct transmission from the user terminal.

As referred to herein the term "data store" refers to a local, remote and/or distributed data store accessible by the control system and by way of example includes digital storage media such as a computer hard drive, solid-state memory, computer RAM, ROM, volatile flash memory, non-volatile flash memory or the like. The data store may be located at a user terminal, at the control system or remotely.

It should be appreciated that the term "store" with respect to data should be understood to include permanent or temporary storage, caching, streaming or the like, e.g. it may not be necessary to store the entire video recording in some applications and instead the video recording could be streamed directly in packets to the automated assessment or second user terminal.

As used herein the term "video recording" should be understood to refer to any electronic recording of moving visual elements and is preferably a digital recording.

The "video recording" is preferably capable of being streamed or downloaded to/from a user terminal.

It will be appreciated that reference to "receiving" and "providing" includes the various modes of transmitting/receiving electronic data, e.g. streaming, uploading, downloading and can be made across any wired or wireless communication medium.

The "assessment signal" may be any form of electronic signal or data capable of being read by said control system and by way of example may include a signal or data generated by a java-script control, compiled Adobe Flash® application, HTML, text message, user-interface control or button or any other type of user input control or sensor that can accept and infer user commands. A hand or body gesture may also form a user input that is interpreted by a gesture recognition system as an assessment signal, e.g. a 'thumbs up' gesture may be interpreted as an assessment signal with a positive indication.

Preferably, upon receiving the access request, the control system determines a user account (hereinafter "accessed user account") corresponding to credentials provided by the first user terminal. Such credentials may be manually or automatically entered at the first user terminal by the entity or alternatively may be stored or cached on the first user terminal or control system and processed by the control system when the access request is made.

The term "classification", as used herein, refers to a determination made by the control system upon receiving and processing an assessment signal. Preferably, the control system generates data representing the classification made. The classification may take many forms but typically will be 'positive', 'negative' or 'inconclusive'.

It should be appreciated that the assessing user need not necessarily be another user having the same security or authorisation status as the entity, i.e. the assessing user may be a security official or other 'super-user' (assigned to assess entities. This 'super-user' (assessment system may be useful, for example, in banking or financial systems where an entity attempts to access financial accounts relating to the accessed user account, i.e. a super-user may be an employee assigned by the bank/finance provider to assess the entity in the aforementioned method.

Preferably, the assessing user is a registered user.

Preferably, the control system at least partially controls data transmission between said user terminals via the data network.

Preferably, the entity may only have data access to the first user terminal and/or data network if they provide user credentials corresponding to a said user account. Such provision of user credentials may be provided manually or automatically by the entity or alternatively may be stored or cached on the first user terminal or control system and processed by the control system when the access request is made.

The assessment signal preferably includes at least one positive, negative or inconclusive assessment signal.

The assessment may be based on a number of factors and therefore numerous circumstances may lead to a positive, negative or inconclusive assessment signal being made. The aspects to be assessed by the assessing user or automated assessment preferably includes at least one of the following assessments:

Actions assessment—e.g. whether or not said entity's prompted performance is a valid response to said prompt.

Thus, the assessment signal may be used as an indication of whether the entity in the video recording is the same entity present when the access request was made and therefore provide other users with the reassurance that the person they communicate with is the entity shown in the video recording.

It will be appreciated that the assessing user may determine the validity of the prompted action based on a number of factors, including:
  the response time of the entity to the prompt;
  the accuracy of the performance to the corresponding prompt instructions;
  any personal prior knowledge of the appearance and behaviour of the user corresponding to the accessed user account, and/or
  their intrinsic human assessment of the genuineness of the performance.

Thus, for example, if a persona that corresponds to the accessed user account is known to the assessing user, the assessing user may be able to discern that errors or even high accuracy in the entity's performed prompts are in or out of character with their knowledge of the persona. Consequently, the assessing user's interpretation of an entity's prompted performance may differ according to any prior knowledge of the corresponding persona.

Visual assessment—e.g. whether or not the entity has been assessed as having a characteristic the same or similar to at least one identifying characteristic of said accessed user account.

An assessment may, by way of example, be made by comparing the entity in the video recording with a profile image, name, gender, residence location, occupation and/or other identifying characteristic of the accessed user account. Thus, other users may be reassured that the entity they communicate corresponds to the persona portrayed by the accessed user account and not an imposter.

Persona assessment—e.g. whether or not the entity is recognised as corresponding to the persona of the accessed user account.

Thus, while the assessing user may believe the entity validly performs the prompted action and matches sufficient identifying characteristics of the accessed user account (i.e. a 'positive' Actions assessment and visual assessment), the assessing user may not recognise the entity as matching the persona portrayed or expected. This may indicate that the entity does not match the persona that the assessing user anticipated, e.g. there may be many entities genuinely purporting to be users having the name "John Smith" that the assessing user may assess as having valid actions and matching profiles, but are not recognised by the assessing user.

General assessment—e.g. the video recording may be assessed for authenticity to determine if the video appears tampered with or is otherwise suspicious. A general assessment may also be made of the entity to assess any other factors not covered by the actions assessment, visual assessment or persona assessment.

Preferably, the assessment signal includes, for each type of assessment made, a positive, negative or inconclusive signal.

Preferably, said control system uses the assessment signal to classify, or contribute to a determination to classify said entity.

Preferably, the classification of the entity is determined by the assessment signal. Examples of potential classifications are outlined in table 1 below.

TABLE 1

| Actions Assessment | Visual Assessment | Classification |
|---|---|---|
| Positive | Positive | Positive |
| Positive | Negative | Negative |
| Negative | Positive | Negative |
| Negative | Negative | Negative |

Preferably, the assessment also includes an indication of whether the assessing user recognises the entity and the classification of the entity is as outlined in table 2 below.

TABLE 2

| Actions Assessment | Visual Assessment | Persona Assessment | Classification |
|---|---|---|---|
| Positive | Positive | Positive | Positive |
| Positive | Positive | Negative | Inconclusive |
| Positive | Negative | Positive | Negative |
| Positive | Negative | Negative | Negative |
| Negative | Positive | Positive | Inconclusive |
| Negative | Positive | Negative | Negative |
| Negative | Negative | Positive | Negative |
| Negative | Negative | Negative | Negative |

It should be appreciated that the classifications above may be altered to suit a particular application or security policy, e.g. in one embodiment, a negative actions assessment in table 2 may lead to a "negative" classification.

In some circumstances, an assessment signal may include an indication that an "inconclusive" assessment has been made, thereby indicating that a positive or negative assessment has not been made for some reason. An "inconclusive" assessment may occur, for example, where:

a poor quality or incomplete video recording is received;
there are insufficient or incomplete identifying characteristics in the accessed user account, and/or
the entity is not recognised by the assessing user.

It should also be appreciated that different positive and negative assessment signals are not both required, e.g. the absence of a positive assessment signal may be interpreted as a negative assessment signal or vice versa.

According to one aspect, where a negative persona assessment is made (e.g. if the entity is not the person expected by the assessing user) then the control system may be configured to request the assessing user provide additional feedback about the entity. The assessing user may for example recognise the entity as corresponding to another persona known to the assessing user, the assessing user thereby identifying the entity as matching that other persona and not the persona portrayed by the accessed user account.

The control system can have numerous configurations for processing a negative classification. Example configurations may include one or more of the following procedures, whereby the control system may;

i) record to the accessed user account that the entity has had a negative classification;

ii) invoke a warning notification for other users attempting to communicate with the entity that a negative classification has occurred. Other users will thus be warned that the entity may be an imposter and should not be communicated with, or at least should be treated with caution;

iii) block the entity from communication with other users;

iv) suspend or cancel the accessed user account;

v) repeat steps b)-d) of the aforementioned method;

vi) repeat steps b)-e) of the aforementioned method;

vii) send a warning notification to a network administrator or other authority to investigate the entity and/or negative assessment;

viii) selectively restrict the type of communication allowed between the entity and other users. The control system, by way of example, may prohibit sending of photos and videos while permitting text-based communication;

ix) selectively restrict the type of access allowed or the extent of access, e.g. access to certain data on the data network may be restricted.

The control system can alternatively, or in addition, have a number of different configurations for processing negative classifications resulting from multiple user assessments or multiple negative classifications. As examples, these may include one or more of the following procedures whereby the control system may:

i) record that the accessed user account has had multiple negative classifications. The number, or proportion of negative classifications made (indicating 'negative' overall assessments) can be used as a measure of the validity or 'trust' ranking of the entity, i.e. the greater the number (or higher proportion) of negative assessments, potentially the less trust-worthy the entity may be;

ii) generate a warning notification for other users, the notification indicating that multiple negative classifications have been made for assessment attempts by the entity. The notification may include details of:
  a. number of negative classifications;
  b. number of negative classifications as a proportion of total positive and negative classifications;
  c. a assessment rating assigned to the entity by other users;
  d. time, date and/or location the negative and/or any positive classifications were made; and/or
  e. permutations and/or combinations of the above;

iii) restrict the entity's access when a predetermined threshold is reached or exceeded of:
  a. number of negative classifications;
  b. number of negative classifications as a proportion of total positive and negative classifications;
  c. a assessment rating assigned to the entity by users;
  d. time, date and/or location the negative and/or any positive classifications were made; and/or
  e. permutations and/or combinations of the above;

iv) suspend or cancel the accessed user account and prevent access when a predetermined threshold is reached or exceeded of:
  a. number of negative classifications;
  b. number of negative classifications as a proportion of total positive and negative classifications;
  c. a assessment rating assigned to the entity by other users;
  d. a assessment rating assigned to the entity by other users where those other users' contribution to the entity's trust ranking is determined by the respective trust rankings of the contributing users;
e. time, date and/or location the negative and/or any positive classifications were made; and/or
f. permutations and/or combinations of the above;
v) repeat steps b) to d) or b) to e) of the aforementioned method when a predetermined threshold is reached or exceeded of:
a. number of negative classifications;
b. number of negative classifications as a proportion of total positive and negative classifications;
c. a assessment rating assigned to the entity by other users;
d. a assessment rating assigned to the entity by other users where those other users' contribution to the entity's trust ranking is determined by the respective trust rankings the contributing users;
e. time, date and/or location the negative and/or any positive classifications were made; and/or
f. permutations and/or combinations of the above;
vi) A warning notification may be sent to a network administrator or other authority to investigate the negative assessment when a predetermined threshold is reached or exceeded of:
a. number of negative classifications;
b. number of negative classifications as a proportion of total positive and negative classifications;
c. a assessment rating assigned to the entity by other users;
d. a assessment rating assigned to the entity by other users where those other users' contribution to the entity's trust ranking is determined by the respective trust rankings the contributing users;
e. time, date and/or location the negative and/or any positive classifications were made; and/or
f. permutations and/or combinations of the above.

The control system can have a number of configurations for processing a 'positive' assessment classification. As examples, these configurations may include one or more of the following procedures whereby the control system may:
i) record to the accessed user account that a positive classification has been made;
ii) invoke a notification for other users attempting to communicate with the entity that a positive classification has occurred;
iii) permit communication between the entity and other users;
iv) provide the entity with read and/or write access to the accessed user account;
v) selectively restrict the type, format or medium of communication allowed between the entity and other users. The control system, by way of example, may prohibit sending of photos and videos while permitting text-based communication;
vi) selectively permit/restrict the type of access allowed or the extent of access, e.g. access to certain data on the data network may be restricted.

The control system can alternatively, or in addition, have a number of different configurations for processing positive classifications from multiple users or multiple positive classifications. As examples, these configurations may include one or more of the following procedures, whereby the control system may:
vii) record to the accessed user account that multiple positive classifications have been made. The number, or proportion of positive classifications made (indicating 'positive' overall assessments) can be used as a measure of the validity or 'trust' ranking of the entity, i.e. the greater the number (or higher proportion) of positive classifications, potentially the more trust-worthy the entity may be;
viii) generate a notification for other users attempting to communicate with the entity that multiple positive classifications have been made for assessment attempts by the entity. The notification may include details of:
a. number of positive classifications;
b. number of positive classifications as a proportion of total positive and negative classifications;
c. a assessment rating assigned to the entity by other users;
d. time, date and/or location the negative and/or any positive classifications were made; and/or
e. permutations and/or combinations of the above.

The control system can have a number of configurations for processing an 'inconclusive' classification or assessment signal. As examples, these configurations may include one or more of the following procedures whereby the control system may:
i) record to the accessed user account that an inconclusive classification has been made;
ii) invoke a notification for other users attempting to communicate with the registered user that an inconclusive classification has occurred;
iii) permit or restrict communication between the entity and other users;
iv) restrict read and/or write access to the accessed user account;
v) selectively restrict the type, format or medium of communication allowed between the entity and other users. The control system, by way of example, may prohibit sending of photos and videos while permitting text-based communication;
vi) selectively permit/restrict the type of access allowed or the extent of access, e.g. access to certain data on the data network may be restricted;
vii) advise the entity of the reason for the inconclusive assessment (e.g. poor video quality, "please enter gender") and prompt the entity to correct the problem.

The control system can alternatively, or in addition, have a number of different configurations for processing inconclusive classifications from multiple users or multiple inconclusive classifications. As examples, these configurations may include one or more of the following procedures, whereby the control system may:
i) record to the accessed user account that multiple inconclusive classifications have been received. The number, or proportion of inconclusive classifications received can be used as a measure of the reliability of assessments of the entity or problems with the accessed user account or first user terminal, i.e. the greater the number (or higher proportion) of inconclusive classifications, potentially an assessing user is less able to make a satisfactory assessment;
ii) generate a notification for other users attempting to communicate with the entity that multiple inconclusive classifications have been received for assessment attempts by the entity. The notification may include details of:
a. number of inconclusive classifications;
b. number of inconclusive classifications as a proportion of total classifications;
c. an assessment rating assigned to the entity by assessing users;

d. time, date and/or location the inconclusive classifications were received; and/or e. permutations and/or combinations of the above.

iii) advise the entity of the reason for the inconclusive assessments (e.g. poor video quality, "please enter gender") and prompt the entity to correct the problem.

Preferably, at least one audio recording of said visible prompted action is recorded and stored, preferably with said video recording. The use of both video and audio recordings may further minimise the chance of deception as the assessing user will also be able to assess if the entity is making the audio (e.g. speaking) in synchronisation with the video showing the entity making the sounds. An audio recording also provides the assessing user with more potentially recognisable information about the entity, including their accent, tone and other voice characteristics. Additionally, the prompt may ask a question of the entity which, when answered, may provide interesting or important information to the assessing user.

In another embodiment, a sequence of touch or gesture-actions may also be recorded, i.e. via using a touch screen or a gesture recognition system such as the Microsoft™ Kinect™ system.

Preferably, the prompt is provided in a form selected from the group including: text, graphical objects, symbols, representations, audible sounds, video, animations, combinations and permutations thereof.

Preferably, the prompt is provided as text or images to improve rapid cognition relative to a dynamic prompt such as video, audio or animations.

Preferably, the prompt is only provided to the entity for a predetermined duration. The duration may thus be set for particular prompts to ensure the entity has enough time to perform the prompted action. Preferably, the duration is less than thirty seconds and more preferably less than five seconds. It will be appreciated that the duration may be varied for a particular prompt depending on the time required for the entity to assimilate that prompt and then perform the corresponding action. Exemplary durations may be between one and ten seconds.

Preferably, multiple prompts are provided for the entity to perform corresponding actions, at least one said action being visible. The multiple prompts may be provided all at step b) of the aforementioned method or alternatively, the two steps b) and c) may be repeated for each individual prompt, e.g. a first prompt could be invoked (step b)) and then recorded and stored (step c)) and then a second prompt invoked (step b)) and recorded and stored (step c)).

It will be appreciated that the longer the total prompt time (i.e. time between the start of the first prompt and the end of the last prompt), the longer an entity must wait, which may prove overly burdensome or onerous for many types of access request. Therefore, in one preferred embodiment, the total time between the start of the first prompt and the end of the last prompt is less than thirty seconds and more preferably less than fifteen seconds. Preferably, at least three said prompts are provided. Three prompts permit a large number of unique combinations to avoid simple forgery without being overly onerous on the entity. However, this should not be seen to be limiting as the number of prompts may be changed to suit the application.

It will be appreciated that an 'imposter' entity trying to falsely obtain a positive classification in the aforementioned assessment method may try and obtain pre-recordings of another entity that has characteristics the same or similar to the identifying characteristics in the accessed user account or the persona the accessed user account portrays. The imposter may persuade the other entity to perform various actions and then try to provide these pre-recordings when prompted. If such an imposter is somehow able to obtain such a recording of for use in the assessment, the imposter may be able to deceive the assessing user with a single such recording. However, requiring a sequence of multiple visible prompted actions greatly reduces the risk of the assessment methods of the present invention being circumvented by an imposter obtaining pre-recordings of single actions.

In a further embodiment, the prompts may be provided in a time-delimited sequence so that the entity is required to perform each visible prompted action in a particular time sequence. By way of example, the timing of the prompts may be in synchronisation with a song, beat, tune or timer or may be provided at preset intervals, e.g. five seconds between each prompt.

Preferably, said prompts are provided to the entity with a time delay between each prompt. The time delays between each prompt are preferably selected from the range between zero seconds and five seconds.

In a further embodiment, the time delays between pairs of consecutive prompts differ and are preferably of an unpredictable length within a predetermined range, e.g. the time delay between first and second prompts may be five seconds while time delay between second and third prompts is ten seconds. This further minimises the risk of falsified pre-recordings being used to deceive other users as a pre-recording would be evident if the actions are not appropriately synchronised with the prompts. Preferably, the details of the prompts provided to the assessing user and/or for analysis are provided in synchronisation with the video recording.

Preferably, the video recording may be controlled by the control system, e.g. the control system may invoke video capture by providing an instruction signal to a recording device (e.g. webcam and/or microphone) at the first user terminal, which then records the performance in real-time. This increases the difficulty of falsifying such recordings by using pre-recordings or other user-provided recordings will not be accepted as valid recordings. Further authentication methods for the recording can be used, e.g. the recording may be tagged with a time, date and IP address, geo-location marker or other time/location identification system. Details of the relevant user terminal could also be provided, e.g. serial number, vendor ID information or the like.

In one preferred embodiment the control system may invoke the prompt by providing computer-executable code or computer-readable data to software on the first user terminal which then generates the prompt accordingly. The code and/or data may also preferably indicate which prompt is to be displayed and time delays between pairs of consecutive prompts. Thus, it should be understood that reference herein to the control system invoking a prompt may also be interpreted to include the user terminal generating prompts on receiving an invocation signal or appropriate data from the control system. It will also be appreciated that the control system may send code or data to another computer system for generating a prompt which is then sent to the terminal.

In one embodiment, the control system may reject recordings if received after a predetermined time-period from when the prompts are invoked, thereby reducing the time and therefore potential for false recordings to be provided.

It will be appreciated that the aforementioned methods may be applied for communication between more than two users, e.g. the video recording may be provided to multiple different users for assessment of the entity. It will also be appreciated that the aforementioned methods may be performed for the second and subsequent users as well, i.e. the assessing user may also be assessed by the assessed entity and/or other users.

Preferably, the control system is configured to receive and process data relating to a view request from said assessing user to view said video recording before invoking or facilitating transmission of said video recording to said assessing user.

Preferably, the data store for storing the video recording is provided separately to the user data store containing the database. Preferably, said video recording is stored with a unique identifier. Storing the video recording separately to the database in the user data store ensures that if the 'video' data store is somehow accessed by an unauthorised entity, the video recording will not have identifying characteristics related to the accessed user account. The unique identifier may also be stored in the database against the accessed user account and so can be used by the control system to invoke or facilitate transmission of the matching video recording from the video data store when required.

In an alternative embodiment, the video recording may be stored in the database in the user data store in a database record related to the accessed user account.

Storage of the video recording alleviates the requirement for an immediate assessment of the entity and thus has one of the advantages of text-based communication, i.e. there is no requirement for both the entity and assessing user to be accessing the network or communications at the same time. The control system may, by way of example, conduct the steps b) to d) when the entity makes an access request. The video recording may then be stored in the data store and retrieved at a later time when requested by the assessing user, or alternatively may be provided automatically when the assessing user makes an access request for communication with the entity and/or accessed user account or persona portrayed by the accessed user account.

The aforementioned method, system and software may thus allow users to communicate primarily be text or audio to maintain real-time visual privacy from other users (by avoiding the need for real-time video communication) while also ameliorating the otherwise inherent risk of deceit, as the assessing user is able to visually verify that the entity is the same person as in the recording by matching the performance in the recording to the details of the prompted actions. If there is no match then this indicates the entity is trying to deceive the assessing user or at least may not be following the prompt instructions. Without such prompt generation and assessment, the entity may provide a false video recording and deceive the assessing user.

The assessing user can also visually verify whether the entity has characteristics the same or similar to the identifying characteristics of the accessed user account. A human's innate ability to recognise facial features and particularly expressions and body language provides a very efficient and accurate means of recognition. The assessing user can choose to reject the communication or take other action if the entity is negatively assessed. The assessing user may also choose to warn other users, a network administrator, police or other authority.

It will be appreciated that a video recording provides far more recognisable information about a person than a static image. A person's characteristic nuances can make it far easier to positively identify than relying on a static image.

The aforementioned method, system and software may thus provide an efficient 'peer-assessment' system that is more effective than text-based authentication systems and allows other users (peers) to conduct the assessment, which is in contrast to conventional systems which place the burden of assessment on the network provider or security software.

Users may provide active feedback to the system via an assessment signal which can be used to indicate whether an assessed entity is deemed to be genuine and should be positively classified. Alternatively, users can make an assessment without feedback and choose whether or not to communicate with the entity based on their own assessment.

In an alternative embodiment, the assessing user may be supplanted with an automated assessment system. Thus, according to another aspect of the present invention there is provided a method of assessing an entity at a first user terminal connected to a data network, said method utilising a control system operable to perform the steps of:
 a) receiving an access request from at least one of:
  said entity;
  a user at a second user terminal connected to the data network;
 b) invoking or facilitating transmission of at least one unpredictable prompt to said entity for a performance of a visible prompted action;
 c) invoking storage of at least one video recording of said prompted action performance from said entity in a data store;
 d) invoking an automated assessment of said video recording;
 e) generating an assessment signal indicative of said assessment.

According to yet another aspect of the present invention there is provided a control system capable of assessing an entity at a first user terminal connected to a data network, said control system including a computer system with a computer processor coupled to a system memory and programmed with computer readable instructions executable to perform the following procedures:
 a) receive data relating to an access request from at least one of:
  said entity;
  a user at a second user terminal connected to the data network;
 b) invoke or facilitate transmission of at least one unpredictable prompt to said entity to perform a visible prompted action;
 c) invoke storage of at least one video recording of said prompted action performance from said entity in a data store;
 d) invoking an automated assessment of said video recording;
 e) generating an assessment signal indicative of said assessment.

Preferably, there is provided computer software for enabling assessment of an entity at a first user terminal connected to a data network, said computer software embodied in computer-readable instructions executable to perform the following procedures:
 a) process data relating to an access request from at least one of:
  said entity;
  a user, at a second user terminal connected to the data network;
 b) invoke, in response to receiving said access request data, at least one unpredictable prompt for said entity to perform a visible prompted action;

c) invoke storage of at least one video recording of said prompted action performance from said entity in a data store;
d) invoking an automated assessment of said video recording;
e) generating an assessment signal indicative of said assessment.

Preferably, said automated assessment includes assessment by a gesture recognition system, wherein said assessment signal respectively includes a positive or negative indication of whether or not said entity validly performed said prompted action.

Preferably, said automated assessment includes assessment by a facial recognition system to analyse the entity's face with respect to an identifying characteristic in the accessed user account and wherein said assessment signal respectively includes a positive or negative indication of whether or not said entity is assessed as having a facial characteristic the same or similar to said identifying characteristic.

Preferably, said identifying characteristic includes a pre-recorded image, video recording and/or stored biometric data of a face.

Preferably, said control system classifies, or contributes to a determination to classify, said entity.

Preferably, said control system includes said gesture recognition system.

Preferably, said control system includes said facial recognition system.

In an alternative embodiment, the automated assessment may be conducted remotely to said control system while being invoked by said control system.

The control system preferably includes software algorithms in conjunction with one or more cameras at the first user terminal to record and assess the action performed and/or face of said entity.

Face and gesture recognition technology is well-known in the art and will not be described in detail herein. However, it will be appreciated that the face recognition system should be capable of detecting facial features and comparing with a reference image, video or biometric data to determine a correlation rating indicative of the similarity between the recorded face and a reference image or video. A gesture recognition system should be capable of detecting visible actions such as hand, facial and/or body gestures and comparing with reference actions or data to determine the gesture performed. The Microsoft™ Kinect™ system is an example of a system including both facial and gesture recognition systems.

In a further embodiment, the control system may be configured to assess the video recording using said facial recognition system and compare the recorded face with identifying characteristics of other user accounts in a user database. Thus, the control system may be capable of identifying multiple user accounts that have identifying characteristics the same or similar to the facial characteristics of the recorded entity, which may indicate that a single entity has multiple user accounts, e.g. the entity may have aliases. The network provider/administrator may then take appropriate action to investigate the entity and determined user accounts to determine whether the entity is falsely portraying themselves as multiple different people.

In another embodiment, the control system may preferably use said face recognition system to assess the entity and compare against a database of user accounts to identify a user account that has identifying characteristics that are the same or similar to the facial characteristics of the recorded entity. Thus, an entity user can be provided access to the data network by letting the facial recognition system 'recognise' them.

Preferably, the control system, in conjunction with the gesture recognition system and/or face recognition system, is configured to determine when a visible action has been performed by said entity and invoke or facilitate transmission of another prompt to said first user terminal to perform another visible action. Thus, rather than providing multiple prompts in a predetermined time-sequence, the control system may determine when the next prompt is required based on the performance response to the previous prompt. The control system is however preferably configured to provide each prompt within a maximum time-limit from the previous prompt to thereby reduce the risk of an entity providing a pre-recorded video recording of the prompted visible actions. Preferably, said time limit is less than twenty seconds.

In another embodiment, the facial recognition system may be configured to analyse the recordings to:
  identify entities accessing the data network that have similar facial characteristics to each other, e.g. an entity may have access to multiple user accounts with one or both accounts being an alias, wherein the face recognition system can assess the video recording to identify any matching identifying characteristics to determine such duplicates and thereby provide administrators with the ability to remove; and/or
  compare the facial biometrics in the video recording with identifying characteristics stored against user accounts to identify the corresponding entity in the video recording. This method allows the control system to automatically recognise and retrieve user identifying characteristics which match the entity in the video recording. This method may also allow the control system to suggest to a user that other users with similar reference identifying characteristics may be genetically related or otherwise connected in some way.

The aforementioned automated methods, software and systems, may provide an assessment having many of the benefits of the earlier aforementioned methods requiring user assessment but without the requirement of an assessing. Thus, this automated assessment system may be useful in applications where an assessing user is not available and/or where other users cannot or should not be trusted as an assessing user. In banking applications for example, an ATM or online banking system may incorporate the automated control system, method and software as aforementioned to allow users to securely access their bank accounts.

Similarly, other applications where such an automated system may be useful may include:
  logging on to a computer, mobile device or other user terminal;
  accessing or operating a user-operable device such as a vehicle or machinery.
  smart phone access;
  physical access, e.g. through security doors;
  virtual network login.

In yet another embodiment, the aforementioned automated method, system and software may be utilised with a said control system located in a user terminal wherein the aforementioned automated assessment process is required in order to access said user terminal.

In another embodiment, the aforementioned methods may be used to assess the competency of the entity, e.g. the prompt may request the entity to perform a sobriety, fatigue or coordination test or other competency assessment, wherein access is granted only if the control system makes a positive classification.

It will be appreciated that there are numerous gesture-based competency tests to determine the physical and/or mental coordination of the entity and any of these tests may be used, e.g. one test includes a 'finger count' where the entity is prompted to touch each finger of their hand to their thumb and count with each touch (1, 2, 3, 4, 4, 3, 2, 1). The assessment made may incorporate a number of factors, including:
  degree of delay between the prompt and the visible prompted action;
  variation from calibrated reference actions;
  unprompted repetition of actions.

The aforementioned method may find particular application in assessing the authority and/or competency of entities attempting to operate machinery that is dangerous or has a high-skill requirement or vehicles such as military, industrial or service vehicles or the like. In vehicles for example, the vehicle ignition may not be operable until the entity has been assessed and a positive classification is made indicating the entity is authorised and deemed competent to operate that vehicle.

The aforementioned control system may be installed or connected to a military or para-military vehicle to prevent enemy combatants or other unauthorised entities from operating the vehicle.

The control system may preferably be configured to provide data to the assessing user or automated assessment indicating visible actions that are invalid responses to the prompt, e.g. the prompt may be "touch your nose" wherein if the entity uses their left hand the visible prompted action is deemed 'invalid' and a negative classification is made. Thus, the control system may be used with a set of rules that can assist the assessment and/or indicate coercion of an entity who has knowledge of those rules.

It should be appreciated that the various aforementioned methods, systems and software may be combined together in various iterations to suit a particular application.

The aforementioned aspects of the present invention may thus provide an enhanced form of entity assessment that negates many of the problems inherent in text-based user-assessment systems or live video communications.

BRIEF DESCRIPTION OF DRAWINGS

Further aspects and advantages of the present invention will become apparent from the following description which is given by way of example only and with reference to the accompanying drawings in which.

BEST MODES FOR CARRYING OUT THE INVENTION

Figure 1:
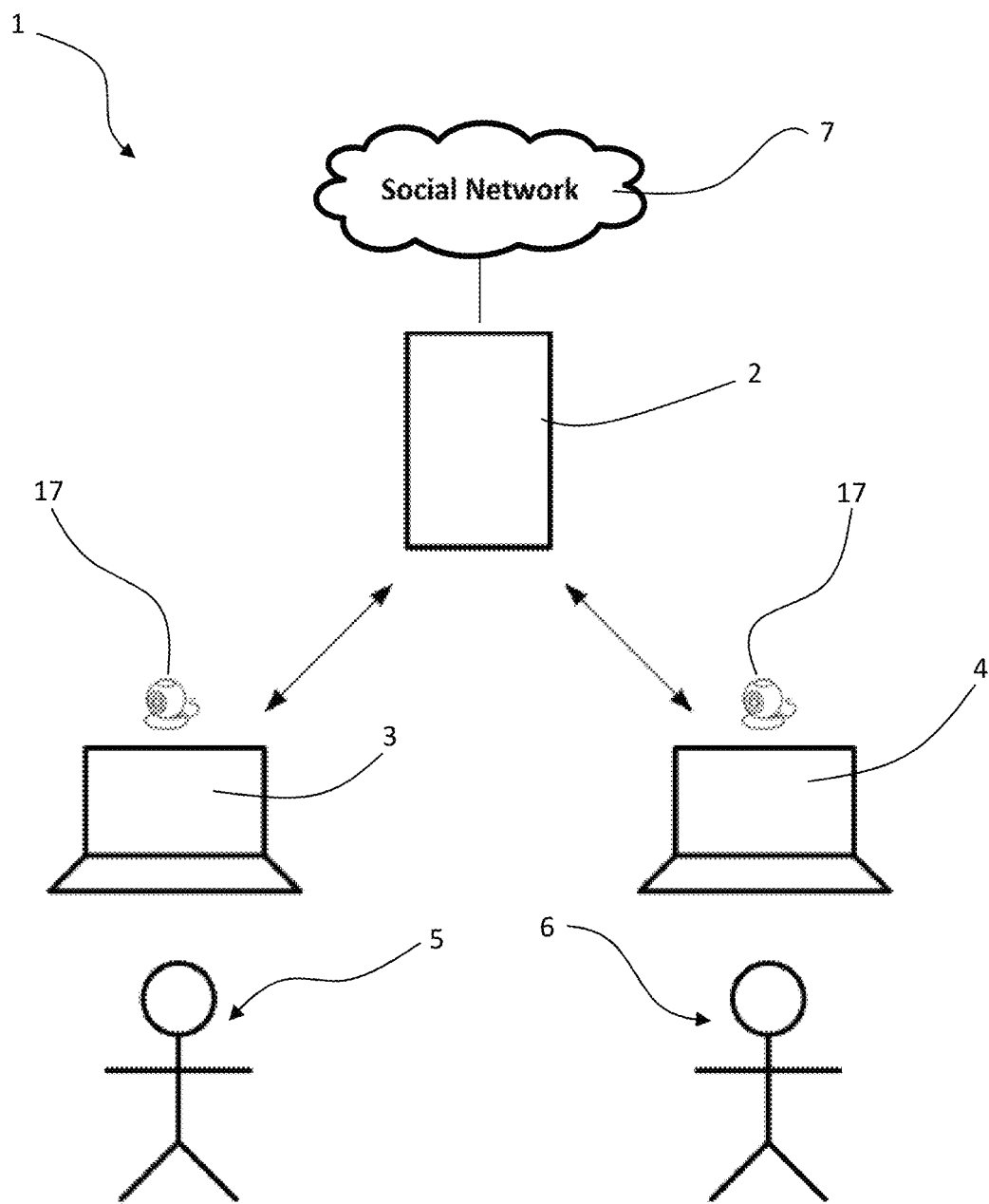
FIG. 1 shows a pictorial representation of two users communicating in a prior art data network.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention covers alternatives, modifications, and equivalents which may be included within the spirit and scope of the present invention as described herein and as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, protocols and other symbolic representations of operations on data bits within a computer memory. These descriptions and representations are the means used by those skilled in the data processing arts to most effectively convey the substance of their work. In the present application, a procedure, logic block, process, function, or the like, is a self-consistent sequence of steps or instructions leading to a desired result. Reference herein will also be made to various "algorithms" which should be understood to refer to one or more computer-implemented processes, procedures, functions and/or calculations that are capable of accessing, reading, processing, modifying, creating or otherwise manipulating data.

The "steps" of each method are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "delivering," "depicting," "detecting," "determining," "displaying," "establishing," "executing," "filtering," "flipping," "generating," "grouping," "hiding," "identifying," "initiating," "interacting," "modifying," "monitoring," "moving," "outputting," "performing," "placing," "positioning," "presenting," "processing," "programming," "querying," "receiving" "removing," "repeating," "resuming," "sampling," "selecting," "simulating," "sorting," "storing," "subtracting," "suspending," "tracking," "transcoding," "transforming," "transferring," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

To aid brevity and clarity, reference herein will also be made to hardware devices in the singular, however, such reference should be interpreted to also include multiple components forming the device and/or multiple devices sharing the function, e.g. reference herein to a "server" should be interpreted to include multiple servers, distributed servers, cloud-based servers and the like.

FIG. 1 shows a known prior art data network (1) controlled by a control system provided in the form of server (2) accessible over a communication system such as the internet or other wired or wireless communication medium. User terminals (3, 4) are connected to, or routed by, the data network (1) by server (2) and are provided in this example in the form of notebook computers (3, 4). The server (2) is of a known type and generally includes at least one computer processor connected by a bus to a system memory and data store storing a database of user records. User accounts are formed from one or more database records relating to the same user. The server (2) is connected to the user terminals (3, 4) via wireless or wired communications systems and all are part of the wider World Wide Web or internet. The server (2) is operable to process computer program modules for processing data held in the system memory and/or data store. The system memory includes RAM, ROM and necessary program modules, e.g. an operating system. The system data store, such as a hard drive or virtual data store, may also store program modules in addition to the database. The user terminals (3, 4) connect to the server (2) via a wired or wireless network of their Internet Server Provider (ISP). The user terminals (3, 4) may also have webcams (17). Users (5, 6) at the terminals (3, 4) can communicate with each other via the server (2).

A virtual network is provided in the form of a virtual social network (7), e.g. Facebook™ Match.com™, LinkedIn™ etc. The virtual social network (7) is formed from the interrelated collection of data records of users/members of the social network, i.e. all users are part of the larger social network. Each given user may have their own individual social network formed by storing a table of user identifiers against the given user's account, the user identifiers corresponding to other users/data records which the given user is connected to, e.g. the given user's "contacts". Social networks generally permit mutual communication via text, audio, static images and/or video that is stored and/or routed by the server (2).

Reference herein to the entity or other user "logging in" to the network (1) should also be interpreted to include Single Sign-On (SSO) systems such as OpenID® or similar systems where a user can 'log-on' to different networks using a single set of user credentials.

As described in the background art section, users (5, 6) accessing the data network (1) are typically only required to provide a combination of user-name and password for authentication. Once authenticated, the user (5 or 6) is free to communicate with their contacts and/or other users. There is typically no requirement for users (5, 6) to include independently verifiable statements about themselves. When a user (5 or 6) is 'signing-up', the social network (1) commonly only requires an email as a unique user identifier (ID) and does not verify that the other identifying characteristics or details the user (5 or 6) is entering are true. This limited authentication method allows users to create accounts with false details or access other user's accounts by finding out that other user's ID and password. There is thus no means for other users to verify the identity of a particular user, except for asking questions which both users know the answer to. However, even this method is not robust as a dishonest person may have already obtained the answers to those questions. Thus, paedophiles, imposters and other malicious users have taken advantage of such cursory security measures and have used social networks to deceive and harm other users.

Some social networks allow users to communicate by live bidirectional video transmission, e.g. 'video conferencing', to verify each other, though, as discussed above, this form of communication is undesirable for many users and must be performed 'live' with both users being present for effective assessment.

Figure 7:
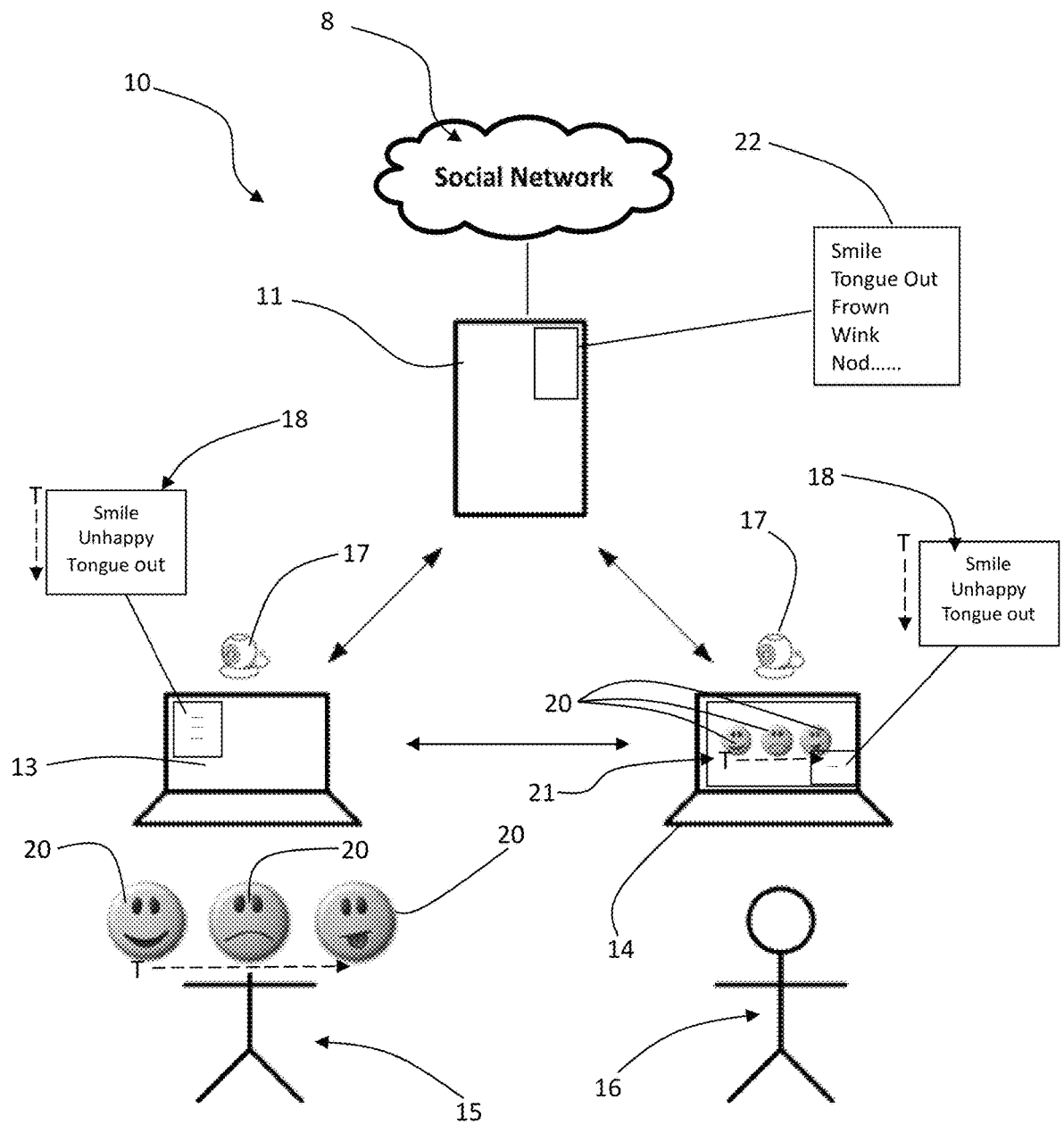
FIG. 7 shows a simplified pictorial representation of a data network and control system implementing a method of entity assessment according to one preferred embodiment of the present invention.
Figure 8:
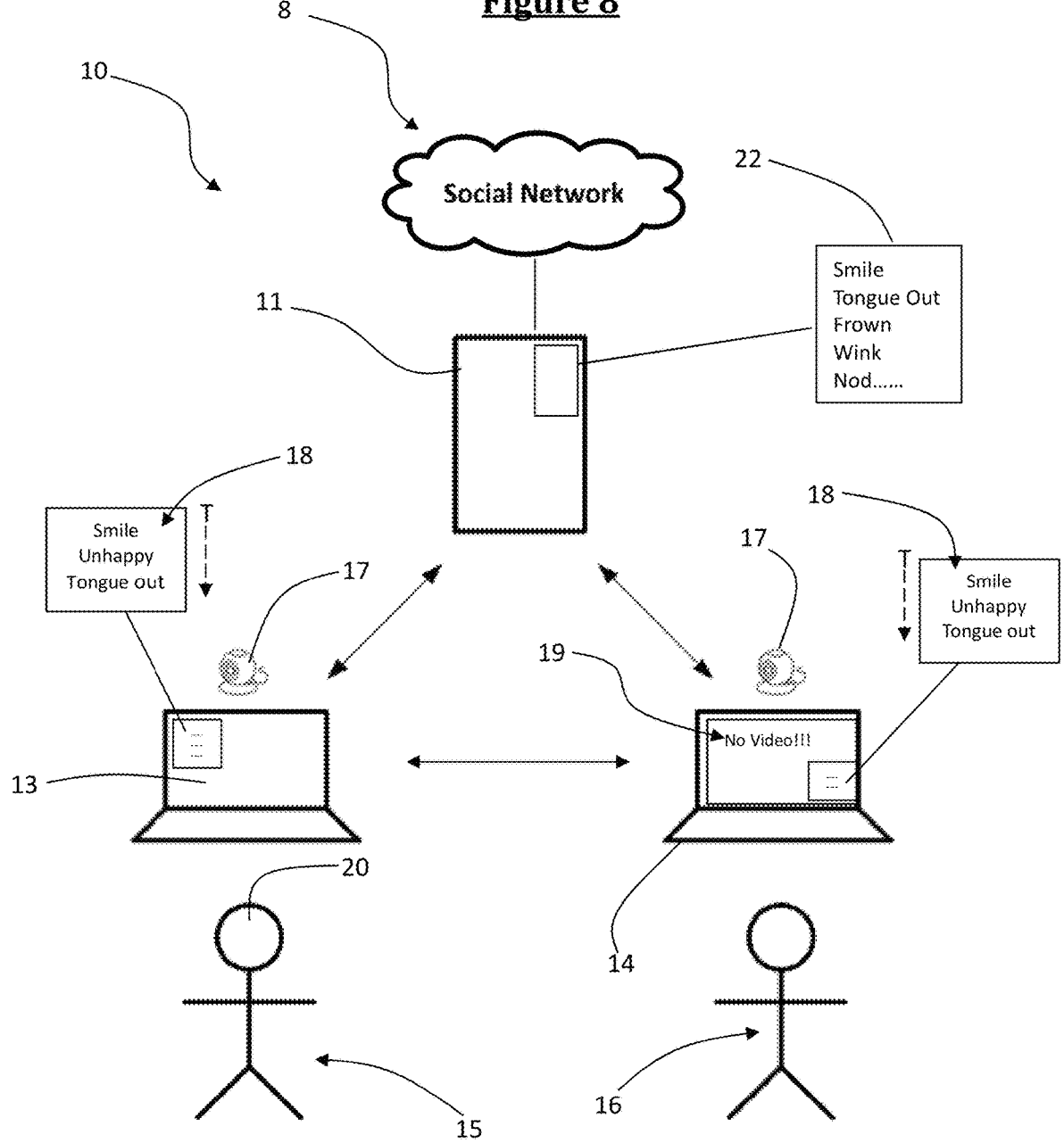
FIG. 8 shows the data network and method of FIG. 7 with one possible assessment.
Figure 9:
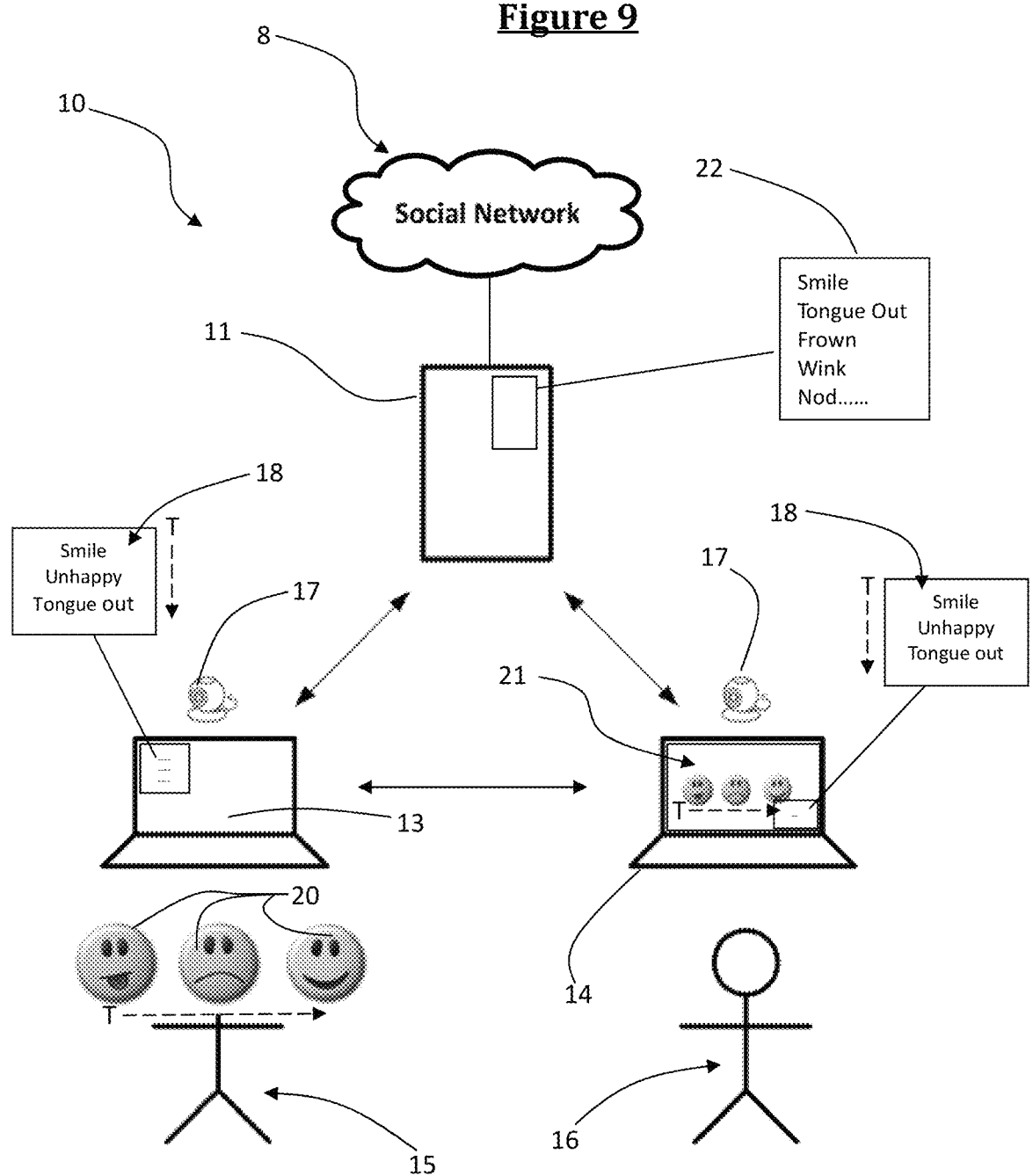
FIG. 9 shows the data network and method of FIG. 7 with another possible assessment.

FIGS. 7-9 show example componentry for a control system provided in the form of server (11) and user terminals (13, 14) that may be used to implement preferred embodiments of the present invention.

The physical hardware involved for accessing and running the social network (8) on the data network (10) is generally comparable to the prior art system shown in FIG. 1, e.g. a control system is provided in the form of a server (11) and is connected to user terminals (13, 14) via a wired or wireless communication medium (not shown) thus providing for communication between an entity (15) and another user (16). The server (11) may store and/or route communications or set up a direct connection, such as a Virtual Private Network (VPN) or other internet tunnelling connection between the terminals (13, 14). Webcams (17) or other video/audio recording devices are provided at each user terminal (13, 14).

Figure 2:
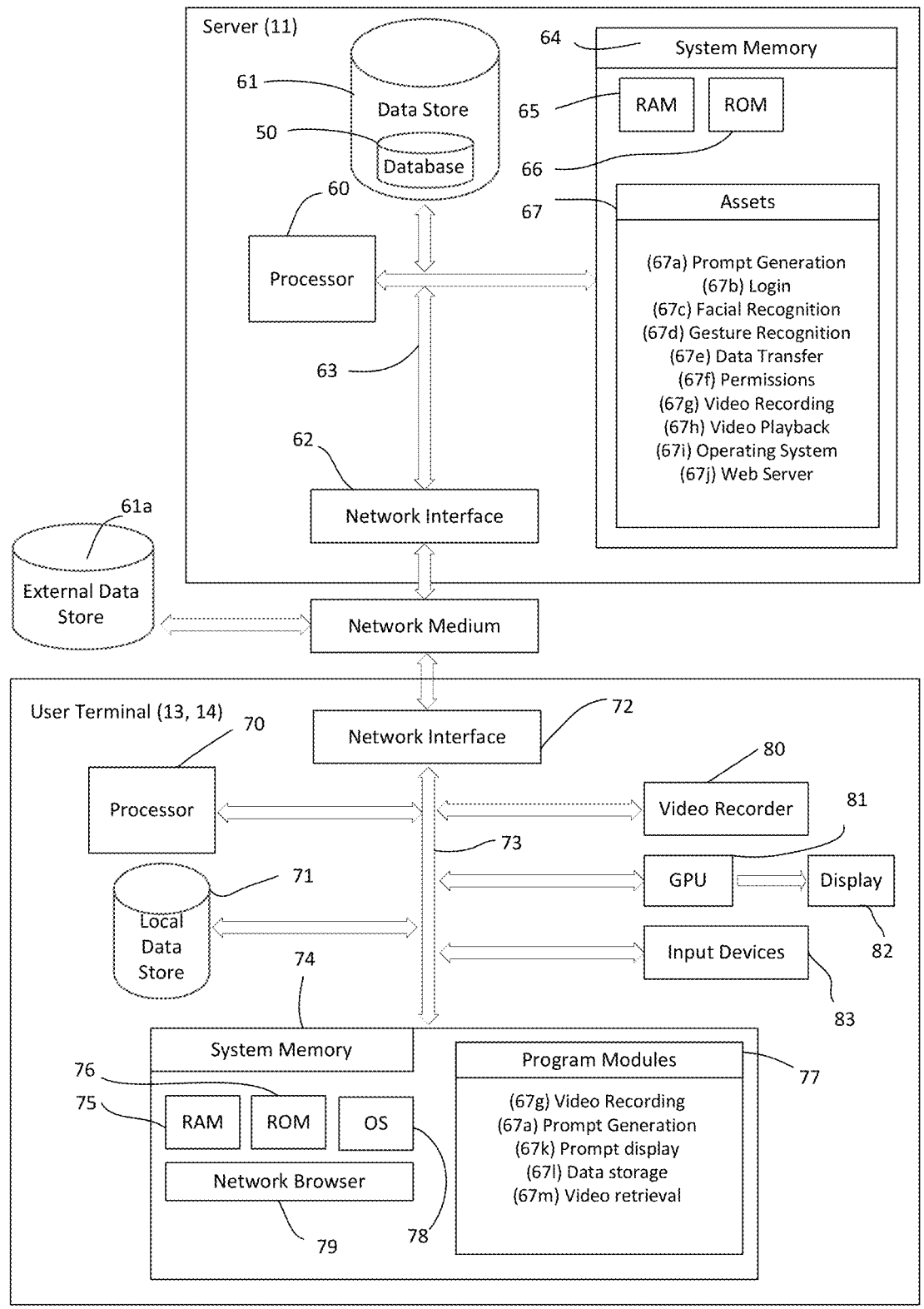
FIG. 2 shows a schematic logic diagram of a network control system according to one embodiment of the present invention.

FIG. 2 shows a more detailed logic diagram of the server (11) and a single user terminal (13 or 14).

The server (11) generally includes a computer processor (60), data store (61), network interface (62) (wireless or wired) and system memory (64) connected via a system bus (63). The system memory (64) includes Random Access Memory (RAM) (65) and Read Only Memory (ROM) (66) along with assets (67) including program modules (67a-m) and other assets (not shown) such as images, text, URLs, scripts and so forth. The program modules (67a-m) may of course be stored in data store (61) and loaded to RAM (65) during operation as needed. The data store (61) also contains a database of user accounts formed from related data records that correspond to a user (e.g. entity—15 or user—16). The user accounts preferably store identifying characteristics of the corresponding registered user, e.g. each registered user's account may contain records specifying the gender, age, occupation, country of residence, nationality, profile image etc. of the registered user.

An external data store (61*a*) is located remotely to the server (11) and can be used to store video recordings (21) with filenames acting as unique identifiers for each recording (21). The data stores (61*a*) and (61) can be used interchangeably for storing various data and thus, any reference to one data store (61) or (61*a*) will be appreciated as being substitutable with the other data store (61*a*) or (61) respectively.

An optional data access module may be included in the program modules (67*a-m*) for determining access parameters to the data store (61*a*). The external data store (61*a*) may take the form of another network server, Network Attached Storage (NAS), cloud storage or any other type of data store.

While reference herein is made to the use of a single server (11) it should be appreciated that multiple servers may be provided and the program modules (67) may be distributed amongst the multiple servers. Furthermore, the data network (10) may operate independently to the server (11) with a different control system/server and only access selected data from the server (11), data store (61*a*) or user terminal (13, 14) when required.

The user terminals (13, 14) also include a computer processor (70), data store (71), network interface (72) and system memory (74) connected via a system bus (73). The system memory (74) includes RAM (75) and ROM (76) along with executable program modules (77). The user terminal (13) also includes an operating system (78) program module and network browser module (79). The user terminal (13) additionally includes an optional Graphics Processing Unit (GPU) (81) which may also be integrated into the CPU (60). A video capture device (80) and user input devices (83) (e.g. mouse and keyboard, or touch-screen, etc) are also connected to system bus (73). The GPU (81) is connected to a display (82) via a video interface such as DVI, HDMI, DisplayPort or similar.

It should be appreciated that while other user terminals may be used that have predominantly the same components as user terminal (13, 14) other alternative example user terminals may have an integrated GPU (81) and processor (70), touch-screen or keypad input device or even no data store, instead having accessible network or cloud-based storage. Examples of user terminals (13, 14) include computers, servers, portable computers and tablets, mobile phones, game consoles, Automated Teller Machines, gambling machines, security screening terminals and indeed any device capable of computing data, recording video, generating prompts and transceiving data with server (11).

It should be appreciated that not all program modules (67*a-j*) may be required in each embodiment as described below, e.g. in the 'peer assessment' methods shown in FIGS. 4 and 5, the facial recognition (67*c*) and gesture recognition (67*d*) modules may not be required. It will also be appreciated that the video recording (67*g*) and prompt generation (67*a*) modules may be located in the user terminal (13, 14) and run locally rather than on the server (11).

The methods of preferred embodiments of the present invention may be implemented using any applicable software platforms such as, but not limited to, Java®, Flash®, HTML5 or any other suitable software platform. In the present example described herein, the method is implemented using an Adobe Flash® application and example screenshots are shown in FIG. 10. It will be appreciated that other software platforms and protocols may be used and the aforementioned platforms are merely provided as examples.

Figure 3:
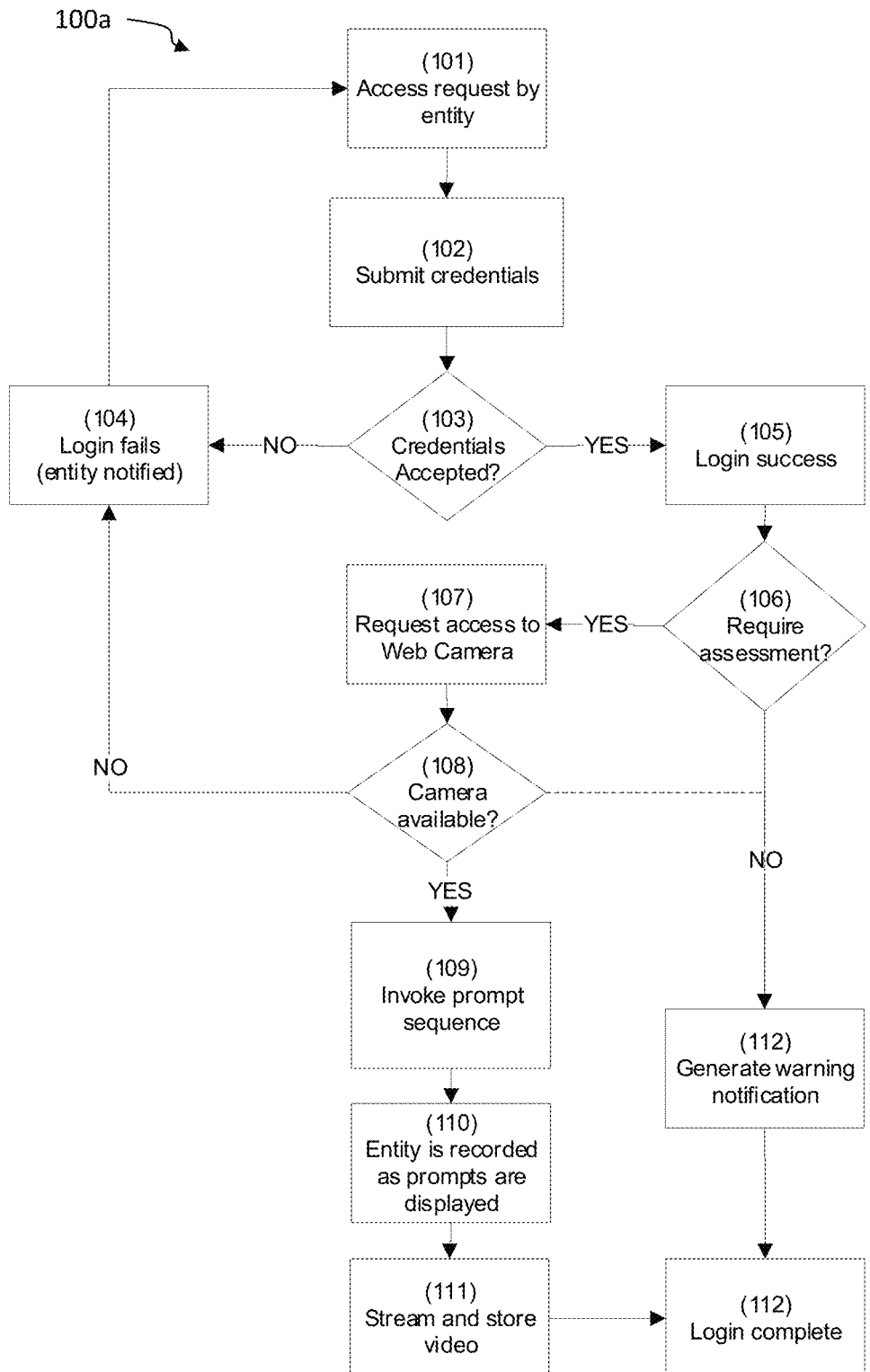
FIG. 3 shows a high-level flowchart representing a first stage of a method of 'peer assessment' of an entity according to one embodiment of the present invention.
Figure 4:
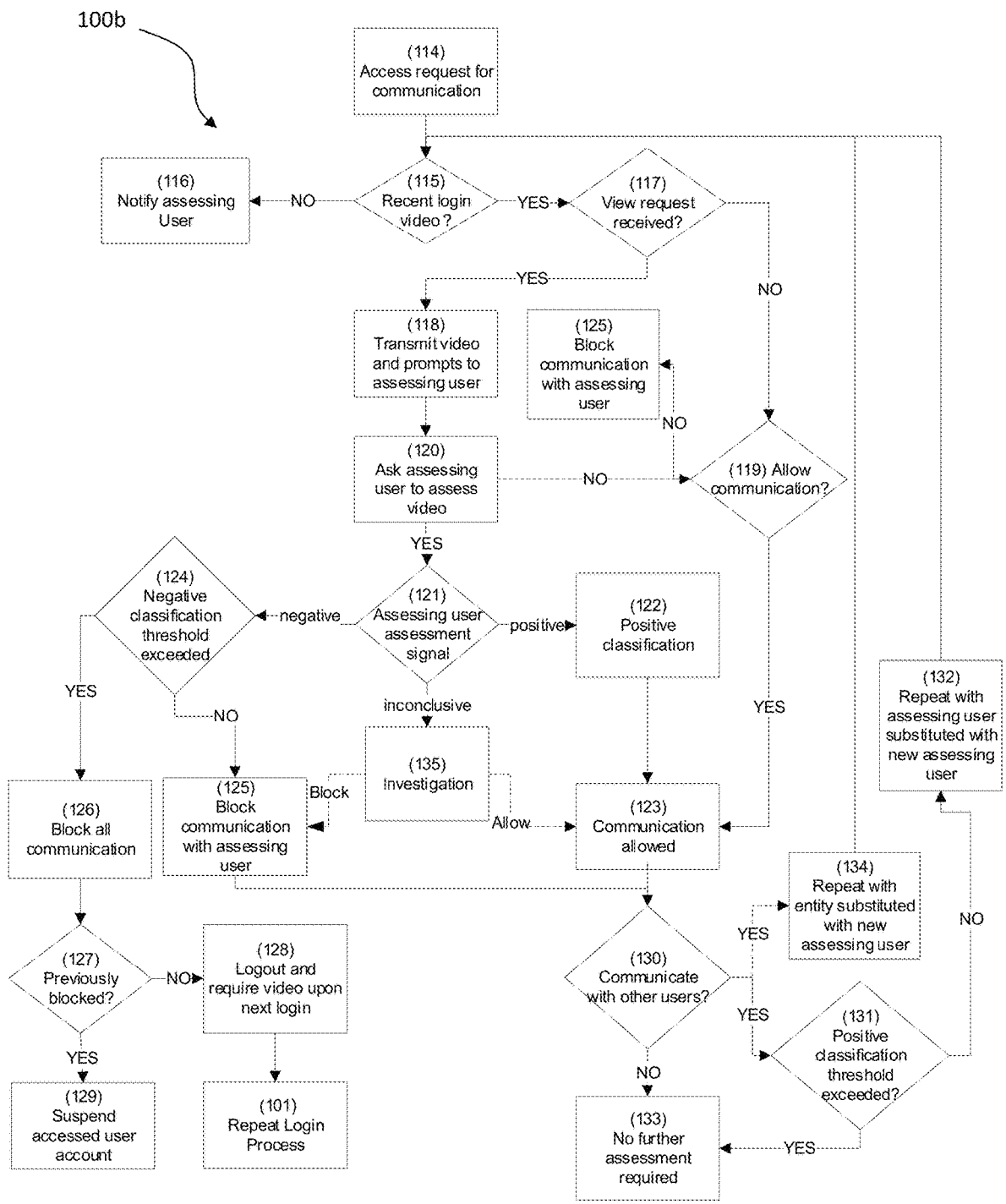
FIG. 4 shows a high-level flowchart representing a second stage of the method of 'peer assessment' of FIG. 3.

One preferred embodiment of a method (100) of entity assessment is shown in FIGS. 3 and 4. The method is for assessing an entity (15) at a first user terminal (13) connected to a data network (10).

In broad terms the method utilises a control system provided in the form of server (11) operable to perform the steps of:
  a) receiving an access request from at least one of:
    (101)—the entity (15);
    (114)—an assessing user (16) at a second said user terminal (14).
  b) invoking (109) at least one unpredictable prompt (18) to said entity (15) to perform a visible prompted action (20);
  c) invoking storage (111) of at least one video recording (21) of said prompted action performance from said entity (15) in a data store (61*a*);
  d) invoking or facilitating transmission (119) of said video recording (21) from said data store (61*a*) and details of said prompt (18) to said assessing user terminal (14) for viewing and assessment by said assessing user (16);
  e) receiving (121) from said assessing user (16) an assessment signal.

Now with reference to FIGS. 3 and 4 the method of entity assessment is described in more detail. This method enables assessment of at least one entity (15) at a first user terminal (13) accessing a data network (10). The method utilises a control system provided in the form of server (11) operable to perform the steps of:

(step 101) Receiving an access request from a first user terminal (13) from an entity (15) purporting to be a registered user of the social network (8) entity (15) and requesting access to the social network (8). The access request includes an initial "login" request (102).

(step 102) The entity (15) will attempt to provide credentials to access a user account (hereinafter accessed user account) that corresponds to a registered user. The credentials provided are typically login credentials, e.g. a user ID and password. The data containing the credentials is sent to the server (11) from the first user terminal (13).

(step 103) The server (11) receives the submitted credentials, and attempts to correlate with a user account stored in the database.

(step 104) If the user ID and password combination does not match a registered user's account, the access request (101) is denied and the entity (15) notified. The entity (15) can then retry the access request, i.e. start again at step (101) or abandon the access. There may also be the option for the entity (15) to request a 'lost' password or reset password link to be sent to the registered user's e-mail address registered in database.

(step 105) If the credentials do match a registered user's account, the initial login is read as a success and a login timestamp generated and stored in the database against the accessed user account.

(step 106) The server (11) then determines whether the entity (15) requires assessment.

(step 107) If the entity (15) requires assessment a request is sent to the first user terminal (13) to access a webcam (17) or other visual communication device. This request may be in the form of a Java remote method invocation, an HTTP GET/POST request (a URL request), an application specific request or similar.

Alternatively, the entity (15) may be required to install software which is able to access the webcam (17) on behalf of the server (11). The webcam (17) is preferably controlled by the software (67) or web server (11) to prevent an imposter from making pre-recordings of one or more of the prompted actions (20) (described below)

and then providing the pre-recordings to the server (11) in place of a 'live' webcam recording.

(step 108) The webcam request is then processed by the first user terminal (13) and a reply sent to the server (11) indicating whether the first user terminal (13) has a webcam (17) or other recording device. The entity (13) may be required to press a physical or software 'button' to consent for the server (11) or local software to access the webcam (17).

It will of course be appreciated that reference to a 'button' also includes software buttons such as a hyperlink, HTML form post, ActiveX control or other software control.

If a webcam (17) is not available, the access request fails (104) and the entity (15) is denied access to the social network (8). Alternatively, the entity (15) may be provided with access to the social network (8) but will have a record on the corresponding registered user's account that the entity was not assessed and a notification (19) generated (112) for other users attempting to communicate with the entity (15).

If a webcam (17) is available but the entity (15) denies access to the webcam (17) then the server (11) may treat the denial as a 'negative' assessment signal, classify the entity (15) negatively and/or may restrict access or take other action as required, as an entity (15) denying access to an available webcam may indicate an imposter.

(step 109) If a webcam (17) is available, the server (11) implements the prompt generation module (67a) to pseudo-randomly select three actions from a populated list (22) of actions (20) stored in a table in data store (61). Prompts (18) for the selected actions (20), the sequence and the time delays between consecutive prompts (18), along with a timestamp and unique identifier, are stored in the database (50) against the corresponding user account. A script or executable is sent to the user terminal (13) which contains details of the prompt sequence to display and other parameters such as the unique identifier and any special instructions.

The script is received at the first user terminal (13) and invokes the prompt display (67k) and video recording (67g) modules to operate using the information in the script.

The time-delimited sequence of three prompts (18) is displayed on the first user terminal (13) to sequentially ask the entity (15) to perform the visible prompted actions (20), e.g. as shown in FIGS. 7-9 the predetermined actions (20) may be a sequence of facial expressions such as "smile", "unhappy" and "tongue out". The prompts (18) are displayed in sequence with the assigned time delay between each prompt (18).

The predetermined actions (20) may be selected pseudo-randomly or alternatively, determined by an algorithm that selects actions based on particular criteria. In a given country for example, the list (22) of possible actions (20) for users may be limited by removing potentially offensive gestures. Similarly, the list (22) of actions (20) may be restricted or determined by the religion, ethnicity, sex, age, or any other user identifying characteristic stored in the corresponding registered user's account. As the actions (20) selected are unpredictable, an imposter would be unable to regularly anticipate the next prompt in order to create a falsified video recording to replace a live webcam (17) video. It should also be appreciated that the actions (20) may include not only facial expressions but alternatively, or in addition—body gestures, sound or any other action visibly discernable and identifiable by an assessing user.

Figure 10A:
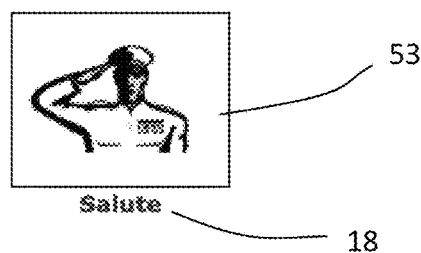
FIG. 10a shows a screenshot of an example of the initial stage of the method of 'peer assessment' of FIGS. 3 and 4.

(step 110) the video recording (67g) module is run concurrently with displaying the prompts (18) enabling the webcam (17) to record a live, real-time performance of the entity (15). An example of the video capture screen (53) and prompts (18) is shown in FIG. 10a. The entity (15) is also able to review a playback of their video recording and can repeat the recoding process if unsatisfied with the recording.

(step 111) Simultaneously (with steps (109) and (110)) the script from the server (11) implements the data storage (671) module to stream the video data to data store (61a) which is stored with a unique identifier as the video filename. As another optional facet of identity information, the location and/or local time of first user terminal (13) may be determined and stored in the database (50) along with the corresponding prompts (18) or alternatively with the video recording (21) in data store (61a).

Alternative embodiments may have a video recording (21) formed as a composite of multiple individual recordings. The recordings (21) may be sent to the data store (61a) individually, or the recordings (21) may be continuous or joined together before being sent to the server (11). The recordings may be streamed to the server (11) or store (61a) or sent as an upload package.

The server (11) generates at least three prompts (18) to minimise the risk of the entity (15) providing pre-recordings or false recordings of a single or two predetermined actions (20). It will also be appreciated that any number of prompts (18) could be provided. Increasing the number of prompts (18) or possible actions (20) correspondingly minimises the ability for an impostor to provide pre-recordings of the corresponding registered user or another person performing those actions (20) in the correct sequence. The total number of unique sequences of prompts (18) and actions (20) possible are determined by the number of prompts (18) and number of different actions (20), according to the equation:

$$P=n!/(n-k)! \text{ where } n \geq k, P=\text{number of unique sequences}, n=\text{number of different possible actions (20)}, k=\text{number of prompts (18)}$$

Thus, by way of example, three different predetermined actions (20) comprised of "smile", "unhappy" and "tongue out" in a sequence of three prompts (18) could be provided in six unique sequences. Adding a choice of a further two different actions (20), e.g. "frown" and "wink", would increase the number to sixty unique prompt sequences.

(step 112) In some circumstances the entity (15) may choose to defer or bypass the video login process (109-111) and proceed directly to access (113) the data network (10). The entity (15) may choose not to conduct the video login process (109-111) if, for example they do not have a webcam (17) or other recording device. However, it will be appreciated that bypassing of the video login process (109-111) also bypasses the benefits to other users of being able to visually assess the entity (15) logged on as a corresponding registered user.

Thus, the server (11) is configured to record (112) in the registered user's account that the entity (15) has not recorded a video login and has not been assessed but otherwise will treat the entity (15) as the corresponding registered user. When other users, e.g. assessing user (16), attempt to communicate with the entity (15) the server (11) sends the assessing user (16) a notification (19) that the entity (15) has no recorded video login and has not been assessed.

This notification (19) may, by way of example, be a message, warning, pop-up control, button or other visible/audible notification. The notification (19) may remain in effect until the entity (15) conducts the video login process (109-111). The video login process (109-111) may also be bypassed if the registered user's account indicates the registered user has special dispensation, or is otherwise not required to verify themselves, e.g. if the registered user is identified as a security administrator or the like.

(step 113) Once the entity (15) has finished the video login process (109-111) and the server (11) has stored the recording (21) the access request and video login process is complete and the entity (15) is provided access to the communication network (10). Alternatively, the entity (15) may view the recording (21) and repeat steps (109)-(111) if they are not satisfied with the recording.

Preferentially, this access process (100) is also completed by the assessing user (16) and each other user accessing the communication network (10) such that all, or at least most users have video recordings (21) for assessment.

FIG. 4 shows an example of a second stage (100b) in a preferred embodiment of the present invention following the video login process (100a) of FIG. 3. This second stage (100b) includes the assessment process of the entity (15) by an assessing user (16). Hereinafter this embodiment shall be referred to as a 'peer assessment' embodiment reflecting the process of using an assessing user (16) i.e. a 'peer' to assess the entity (15).

(step 114) The entity (15) and assessing user (16) have logged in (105) to the network (10) whereupon the assessing user (16) makes an access request for communication with the entity (15) or the entity (15) requests communication with the assessing user (16). The access request may take the form of an instant message, email, blog, forum posting, picture tagging, voice chat or any other communication. The access request (114) to the server (11) also contains user data identifying the entity (15) and assessing user (16).

(step 115) Upon receiving the access request, the server (11) queries the database and accessed user account to determine if a timestamp (generated at (109)) exists for the last video login recording (21), and if so determines whether the timestamp is within a preset range, i.e. the accessed user account has a recent video login recording (21).

(step 116) If a timestamp does not exist or the timestamp is outside the preset range, i.e. there is "No" recent video, the server (11) is configured to generate a warning notification (19) (e.g. as shown in FIG. 8) or retrieve a previously generated warning notification (generated as per step (112)), notifying other users that the accessed user account does not have a login video (21).

The server (11) may also be configured to require a new video login (21) from entity (15) before the entity (15) can communicate with others as the entity (15). The requirement for an updated video may thereby reduce the opportunity of an imposter illegitimately accessing a registered user's account after the genuine registered user has already completed the video assessment process (100a) and then pretending to be the genuine registered user.

The assessing user (16) may also choose to avoid/cancel communication with the entity (15) if the accessed user account does not have a recent login video (21).

(step 117) If a recent video login (21) is available the server (11) provides an HTML file or similar to the assessing user (16) with the unique identifier for the recent video (21). The video retrieval module (67m) pre-fetches from data store (61a) the recent video recording (21) (or part thereof) that matches the unique identifier. A still image of part of the video (21) is displayed to the assessing user (16) who may then activate a 'VIEW' button or other control which is interpreted by data store (61a) as a "view request" of that video (21). It should be appreciated that the "view request" may be controlled by the user terminal (14), data store (61) or server (11) depending on where the video recording (21) is stored and how the system is configured.

(step 118) If the assessing user (16) makes a 'view request' this invokes the transmission of the video (21) to the second user terminal (14) from data store (61a). The unique identifier is also used to retrieve the corresponding prompts (18) from server (11) for simultaneous synchronised display overlapping the video (21). Examples of the display of the video (21) and prompts (18) are shown in FIG. 7 and FIG. 9. It will be appreciated however that the prompts (18) will not be displayed together and instead are displayed singularly in sequence with time delays between consecutive prompts. It should also be appreciated that the video (21) need not be pre-fetched and may instead be streamed or downloaded when the view request control is activated.

The assessing user (16) is thus able to assess whether or not the recording (21) shows the entity (15) performing the predetermined actions in the correct sequence as is shown in FIG. 7, or in an incorrect sequence such as shown in FIG. 9.

(step 119) The assessing user (16) can alternatively choose not to make a view request. The server (11) may then allow (123) or block (125) communication over the social network (8) between the assessing user (16) and entity (15) depending on the security policies of the social network (8).

(step 120) After viewing the recording (21) the assessing user (16) is asked to assess the entity (15) in the recording (21). Additionally, the assessing user (16) is preferably provided access to identifying characteristics of the accessed user account, e.g. the name and a profile picture of the registered user. If the assessing user (16) chooses not to assess the entity (15) the server (11) determines (119) whether or not to allow (121) or block (132) communication over the social network (8) between the assessing user (16) and entity (15)

(step 121) If the entity (15) is assessed, the assessing user (16) provides an assessment signal which includes a positive, negative or inconclusive indication of whether or not they consider the video recording (21) and recorded entity (15) to be 'trustworthy' or potentially an 'imposter'. The assessment signal may be generated by selection of a button or other user control.

The assessment signal is preferably composed of a number of individual assessment signals corresponding to the different possible assessments to be made. Examples of the assessment types preferably include the following:
a) Actions assessment—i.e. whether or not the entity's (15) actions (20) are a valid response to the prompts (18), e.g. did the entity (15) perform the correct actions (20) in the correct sequence given the prompts (18) made?

b) Visual assessment—i.e. whether or not the entity (15) has been assessed as having the same or similar characteristics as the identifying characteristics of the accessed user account, e.g. does the entity (15) appear to match the profile image stored in the accessed user account?

c) Persona assessment—i.e. whether or not the entity (15) is recognised as corresponding to the persona of the accessed user account, e.g. is the entity (15) the person who you expected?

The accessed user account may portray a particular persona through various identifying characteristics such as name and location indicating a particular person. However, in some circumstances the accessed user account may be created by an entity (15) attempting to portray themselves as someone else, e.g. a famous actor/actress or politician. The entity (15) (who may be a valid registered user) may have common identifying characteristics (e.g. age, appearance, gender) to the persona portrayed and so the assessment at b) should have a positive result. However, the assessing user (16) may make the additional assessment that while some of the characteristics match, the entity (15) is not who was expected based on the persona portrayed. This persona assessment may also apply where the persona matches a relative or personal acquaintance of the assessing user.

d) General assessment—e.g. is the video recording (21) suspicious?

The assessing user (16) may select from a range of assessments that provide differing information about the video recording (21) and entity (15). For example, the assessment signal provided may be processed by the server (11) as a "classification" for the entity based on the results of the above various assessments made by the assessing user.

The following Table 4 shows one example of the assessments made and potential resulting classifications:

| Action Assessment | Visual Assessment | Persona Assessment | General Assessment | Classification |
|---|---|---|---|---|
| Positive | Positive | Positive | Positive | Positive |
| Positive | Positive | Positive | Negative | Negative |
| Positive | Positive | Negative | Positive | Inconclusive |
| Positive | Positive | Negative | Negative | Negative |
| Positive | Negative | Positive | Positive | Negative |
| Positive | Negative | Positive | Negative | Negative |
| Positive | Negative | Negative | Positive | Negative |
| Positive | Negative | Negative | Negative | Negative |
| Negative | Positive | Positive | Positive | Inconclusive |
| Negative | Positive | Positive | Negative | Negative |
| Negative | Positive | Negative | Positive | Inconclusive |
| Negative | Positive | Negative | Negative | Negative |
| Negative | Negative | Positive | Positive | Negative |
| Negative | Negative | Positive | Negative | Negative |
| Negative | Negative | Negative | Positive | Negative |
| Negative | Negative | Negative | Negative | Negative |

The classifications can of course be altered to suit particular applications and security policies.

(step 122) If the server (11) makes a positive classification, the server (11) may be configured to then record to the accessed user account that the entity (15) has been assessed positively. The server (11) may remove any existing warning notifications (19) and/or add a "positively assessed" notification (not shown) such that other users are able to see the entity (15) has been positively assessed. The server (11) also records to the database in the accessed user's account the total number of positive classifications made.

(step 123) Once a positive classification is made, the server (11) can allow the entity (15) to communicate with the assessing user (16) over the social network (8).

(step 124) If the server (11) makes a negative classification, the server (11) then records to the accessed user account that a negative assessment has occurred, e.g. an imposter may have tried to communicate on the network (8). The server (11) may then generate a warning notification (19) for other users attempting to communicate with the entity (15). The server (11) also records the number of negative classifications made to the accessed user account in the database (50). An alert may also be provided to an administrator to investigate.

The server (11) also queries the database (50) to determine the total number of negative classifications made and if the number (or ratio of negative to positive classifications) is over a preset threshold.

(step 125) If the server (11) determines at (124) that the threshold is not exceeded, the server (11) may automatically prevent ('block') communication between the entity (15) and assessing user (16) for the duration of the first user's login period or other predetermined time period. The entity (15) is blocked from interacting with the assessing user (16), but as sufficient other users have not marked the entity (15) as suspicious (i.e. negative classification threshold not exceeded), the entity (15) remains logged in as the registered user and has the opportunity to interact with other users as per (130). Alternatively, the entity (15) may be asked to repeat the assessment process from step (109), i.e. they are given the opportunity to create a new login video (21).

(step 126) If the server (11) determines at (124) that the threshold is exceeded the server (11) may automatically block communications between the entity (15) and any other users for the duration of the first user's login period or other predetermined time period. The server (11) also records to the accessed user account that communication has been 'blocked'.

(step 127) The server (11) then queries the database and determines if the entity (15) has been previously blocked.

(step 128) If the server (11) determines that the entity (15) has not been blocked previously, the server (11) may be configured to automatically log out the entity (15) and require the entity (15) perform the video login process (steps 107-111) upon their next login, i.e. the entity (15) is returned to step (101).

(step 129) If the server (11) determines that the entity (15) has been blocked at least once previously, the server (11) may be configured to automatically suspend the accessed user account and/or notify a system administrator or other authority to investigate.

(step 130) After assessment is complete at step (123) or if communication has been blocked (125) for the first time, the server (11) may be configured to determine (130) whether the entity (15) wants to communicate with other users, in addition to, or instead of the assessing user (16).

(step 131) If the entity (15) does want to communicate with other users, the server (11) queries the database (50) for the accessed user account to determine if the number of positive classifications or ratio of positive to negative classifications is over a preset threshold.

(step 132) If the accessed user account indicates that the positive classification threshold is not exceeded, i.e. the answer at step (131) is "No", the assessment process (115 onwards) is repeated for each additional user (replacing the assessing user (16) in the process with the additional user) until a sufficient number of positive classifications is reached.

Alternatively, step (131) may be performed for every additional user or for randomly selected additional users.

(step 133) If the accessed user account has a sufficient number of positive classifications, the entity (15) may be allowed to freely communicate with other users. However, such other users may be notified that the entity (15) has sufficient validations and the other users may still be able to request the entity (15) re-verify themselves and any other users for the duration of the first user's login period.

In configurations where the entity (15) does not require communication with any other users, no further action is required in the process.

(step 134) As an alternative to step (131), if the entity (15) does want to communicate with other users, the server (11) may require the assessment process (115 onwards) to be completed by the other users, i.e. the entity (15) is substituted with an 'additional user'. Thus, once the entity (15) has accessed the communication network and been assessed positively they may be free to communicate with other positively assessed users and/or require other users to be assessed by the entity (15). This step (133) may be performed for every additional user, for a predefined number or for selected additional users.

(step 135) In some circumstances the assessment signal received may indicate an inconclusive assessment. The inconclusive classification may result from a mix of positive or negative assessments as detailed in Table 4 or where the assessing user otherwise explicitly indicates they cannot make a conclusive assessment, e.g. if the video quality is poor, there are insufficient identifying characteristics to make the visual and persona assessments or any other reason. Where an inconclusive classification is made the server (11) may be programmed to trigger an 'investigation' of the inconclusive classification. Such investigation may include:
a. notifying an administrator or the like;
b. requesting further information from the assessing user, e.g. why was the assessment inconclusive;
c. requesting the entity (15) to repeat the video login procedure (100*a*);
d. requesting the assessing user (16) repeat the assessment (120);
e. another appropriate response.

As a result of the investigation (135) the entity (15) may be blocked (125), or allowed (123) to communicate with the assessing user (16).

While the aforementioned method of entity assessment shows the prompts (18) and recording process ((107) to (111)) taking place when the entity (15) is 'logging in' to the social network (8), it should be appreciated that these steps ((107) to (111)) may alternatively, or in addition, be required at any access request which will result in communication or other interaction between the entity (15) and another user or may be required on demand of the assessing user (16) or another user.

A specific computer software implementation of the aforementioned method of entity assessment shown in FIGS. 3 and 4 is now generally described. It should be appreciated that the following implementation is purely exemplary and numerous software platforms and configurations may be used without departing from the scope of the present invention. The hardware required has already been shown and described with respect to FIG. 2. To aid succinctness, notation herein to a forward slash (/) prefix should be understood to refer to a Uniform Resource Locator (URL) from the host website, e.g. "/example" refers to www.example.com/example.

At least three tables are provided as part of the database (50) in data store (61). These tables include:
TBL_ACTIONS. Each TBL_ACTIONS record includes:
a prompt description of an action (20);
the time period that prompt (18) needs to be displayed for;
a 'prompt' key;
TBL_ACTIONGROUP. This table is populated with the /get-clip script. Each TBL_ACTIONGROUP record includes:
three prompt keys from the TBL_ACTIONS table;
corresponding time period that the prompts (18) are displayed;
the order in which the prompts (18) are provided;
a timestamp with the date/time when the TBL_ACTIONGROUP record was created;
a user ID of the accessed user account on the social network (8);
a corresponding 'ActionGroup' key;
TBL_ASSESS. This table is populated with the /assessment script. Once the recording (21) has been viewed by the assessing user (16), the assessing user (16) assesses the entity (15) and selects a series of buttons respectively indicating positive, negative or inconclusive assessments for the 'actions', 'visual', 'persona' and 'recording' assessments, each button generates a corresponding positive, negative or inconclusive assessment signal. Each TBL_ASSESS record includes:
the ActionGroup key;
the user ID of the assessing user (16);
a positive, negative or inconclusive assessment classification as determined according to Table 4 using the received assessment signals. Any received 'inconclusive' signal received results in an 'inconclusive' classification.
a timestamp with the date/time when the assessing user (16) viewed the recording (21) and provided the assessment signals.

In addition, the social network (8) has a database with user accounts corresponding to registered users and having such fields as: user ID, user IDs of other users accessible by that registered user, identifying characteristics and various other details. Such databases are known and will not be described further. The social network database may be formed as part of the server database (50) or may be provided separately with the server (11) and/or user terminals (13, 14) having at least partial access to the records.

Two Flash™ applications are provided including a "video playback module" (67*m*) and a "video recording module" (67*g*). These modules are stored as SWF files in the server (11) and are served to the user terminals (13, 14) when the user terminal (13, 14) requests them. The user terminals (13, 14) are able to request these modules as they are referenced in HyperText Markup Language (HTML) which is served to the user terminals (13, 14) in a previous HyperText Transfer Protocol (HTTP) GET procedure when the entity (15) or assessing user (16) makes an access request (101) or (114).

Hypertext Pre-processor (PHP) and HTML Scripts are provided. The PHP script is executed when the client (first user terminal (13)) does GET or POST requests. The PHP script can output HTML or Text. The PHP script can also run database queries. The scripts include:

/get-clip. When an access request (101) or (114) is made via a network browser (79) on the first user terminal (13) to the server (11) the /get-clip script causes the PHP engine on server (11) to query the database (50) and create a new record in TBL_ACTIONGROUP with the records described above. The ActionGroup key also forms the filename that the subsequent video recording (21) will be saved as when made. The video recording filename (ActionGroup key) is specified as a parameter to pass to the video recording module (67g) when it is executed. The video recording module (67g) then severs (if not already cached) and then loads the recording parameters.

/actionxml. Uses the ActionGroup key and queries TBL_ACTIONS to retrieve the corresponding sequence of prompts (18) which is then passed to the first user terminal (13) as an XML file. Using the ActionGroup key in the Flash™ applications rather than the prompt keys or prompt information ensures interception of the XML can't be used to identify the prompts (18) and therefore provide an entity (15) with a means for pre-recording a video with the correct prompt sequence before receiving the prompts (18).

/view-clips. When an assessing user (16) makes a communication request (114) from second user terminal (16) the /view-clips script is requested by browser (79). The /view-clips script extracts from the social network database the assessing user's ID, other accessible user's IDs and names, including the entity (15). An 'ActionGroup' query is run on the server database (50) for each user ID returned from the social network database query. The ActionGroup query returns any records from TBL_ACTIONSGROUP where the corresponding user has a related record and, if so, the most recent ActionGroup key (as determined from the corresponding timestamp) is returned as a parameter. The ActionGroup key is also the filename of the last video recording (21) and thus the /view-clips script ensures only users with a video recording (21) are returned by /view-clips and only with their most recent recordings.

The ActionGroup key, user ID and assessing user ID is then passed as a parameter to the video playback module (67h) when it is executed.

The view recordings page (shown in FIG. 10b) is sent to user terminal (14) and the video playback module (67h) reads in the parameters and requests from the data store (61a) the corresponding video recording file (FLash Video (FLV)) over HTTP and the first frame of the video recording (21) is fetched and displayed on the browser (79) next to the corresponding user's name.

An assessment rating (51) is also calculated and retrieved by running a query of TBL_ASSESS using the ActionGroup key and calculating: Total positive classifications/(Total classifications)*100 this thereby gives a percentage assessment rating (51). This assessment rating (51) is displayed as text next to the first frame of video recording (21) on browser (79).

/assessment. This is a URL that the video playback module (67h) calls to record the assessment signals assigned to the entity (15) by the assessing user (16). The parameters passed with this script include the ActionGroup key, of assessing user ID and positive, negative assessment or inconclusive signals. The /assessment script checks for a valid ActionGroup key, and writes the appropriate record to TBL_ASSESS with the determined assessment classification and assessing user ID. The ActionGroup key will not be 'valid' if no matching key exists in TBL_ACTIONGROUP or the record in TBL_ACTIONGROUP has a timestamp outside a preset range, e.g. the record is too old.

The video recording module (67g) Flash™ application performs the following procedures:

reads in a parameter from /get-clip. which is the ActionGroup key stored in TBL_ACTIONGROUP.

issues a requests to /actionxml using the recording filename which returns the corresponding three prompt keys.

starts the camera (17).

starts streaming the video recording (21) over a Real Time Messaging Protocol (RTMP) to the data store (61a), which converts the stream to a Flash Video (FLV) file with the recording filename being the ActionGroup key.

displays text "Please get ready".

displays the prompts (18) in pseudo-random sequence with a time delay between each prompt (18) and a notification of time available to perform each prompt (18).

a 'cue' timestamp is inserted into the video recording (21) stream when each prompt (18) is displayed, thereby indicating the time the prompt display started.

stops streaming.

shuts down.

redirects first user terminal internet browser to a new page /view_clips where the entity is able to view their video recording (21).

The video playback module (67h) Flash™ application:

reads in the parameters from /view-clip which include the most recent ActionGroup key for each corresponding user.

issues a request to /actionxml using the ActionGroup key which returns the three prompts (18).

requests the movie FLV over HTTP from data store (61a).

waits until the assessing user (16) makes a view request (117) by selecting a "play" button on browser (79).

plays the FLV video on the user terminal (14) browser (79). The corresponding prompts (18) are displayed when a cue timestamp is detected.

asks the assessing user (16) to select buttons indicating positive, negative or inconclusive assessments for the 'actions', 'visual', 'persona' and 'recording' assessments.

when the assessing user (16) selects a button then a HTTP request is made to /trust-response with the ActionGroup key, the user ID of the assessing user (16) and the assessment signal. The /assessment PHP script stores a record in TBL_ASSESS accordingly.

It will also be appreciated that the aforementioned method may be altered to suit the social network, security policies or similar. It should also be appreciated that the software may be constructed and run using different programming platforms, e.g. JavaScript™, HTML5, Microsoft™ Silverlight™ etc.

It will be appreciated that the aforementioned embodiments are particularly suited for use in general social networks, children's social networks, gaming networks and/or relationship facilitation services such as 'dating' websites.

The aforementioned assessment method (100a-b) may also require the entity (15) and/or assessing user (16) to perform an initial video login process (109-111) when registering an account in the database. The recording(s) (21) may then be stored on the server (11) and used as a reference recording. Thus, in the event of a dispute between users and/or where suspicious activity arises, another user, a network administrator, and/or an investigator can view the initial recording and compare with subsequent recordings to determine whether the person shown is the same in both.

There have been numerous instances of internet sites or social network profiles/accounts being set up by entities impersonating celebrities, public figures, companies or other public or private entities. These entities may then deceive other users as to their identity and/or tarnish the reputation of the person/entity they are impersonating. In such instances it is difficult to verify the authenticity of the user without directly contacting the supposed entity by alternative means, e.g. phone.

The present invention however may alleviate this problem by providing an assessment recording (21) (as previously described) showing unpredictable prompts (18) and an entity (15) performing (or not) the prompted visible actions (20). If the entity (15) shown in the recording (21) is assessed negatively (15), then other users will be aware the accessed user account may have been accessed by an imposter and can notify the network administrator, other authority or simply treat the entity as they want.

Figure 5:
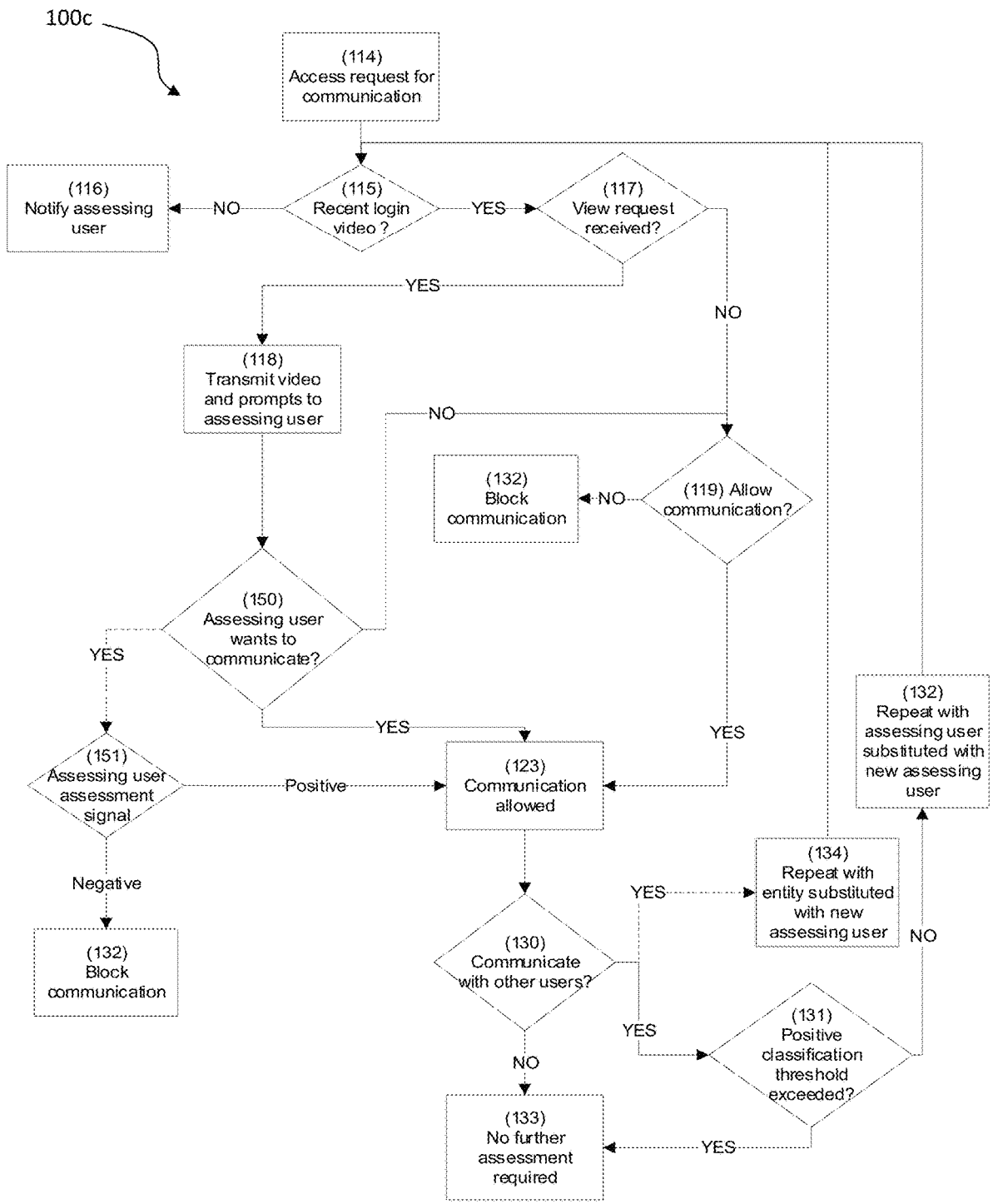
FIG. 5 shows a high-level flowchart representing an alternative to the second stage of the method of entity assessment of FIG. 4.

FIG. 5 shows an alternative peer assessment method 100c that uses the initial method 100a and is generally similar to method 100b but differs in that no assessment (120 onwards) is required. Accordingly the same reference numerals are used for common steps in methods 100b and 100c. In relationship facilitation services (e.g. dating and friend making websites) the primary goal of users is often to meet new people and assess those people for potential relationships. However, the aforementioned assessment methods (100b) require the assessing user (16) to make multiple assessments, e.g. actions, visual, persona and general, some of which may be overly onerous or impossible when assessing an entity (15) they have never met before. Therefore, the method (100c) is an embodiment which still provides many of the advantages of the aforementioned method (100b) but which does not require the assessing user (16) to provide an assessment signal, i.e. the assessing user (16) is free to choose whatever action to take based on their own assessments.

Thus, instead of an active assessment (121), the assessing user (16) on viewing the video recording (21) can make a choice (150) on whether or not to communicate with the entity (15) shown in the recording (21). If the assessing user (16) does not want to communicate, the server (11) is programmed to allow communication or not as described with respect to 100b. The method (100c) provides the assessing user (16) with the same information to assess the entity (15) as in the 100b method but without requiring active feedback from the assessing user (16) via the assessment signal. The burden on the server (11) is thus reduced relative to the method 100b. In one further embodiment, shown as optional step (151) in FIG. 5, the assessing user (16) may also select a user interface button control at the assessing user terminal (14) to generate a positive or negative assessment signal respectively indicating whether or not they positively assess the entity (15) or want to communicate with the entity (15). No further action is taken if the assessment signal is positive and the entity (15) and assessing user (16) are free to communicate. However, if the assessment signal is negative then the server (11) may prevent or restrict communication from the entity (15) to the assessing user (16) for the rest of the entity's login session, permanently, temporarily or until the assessing user (16) provides a positive assessment signal.

In the embodiments shown in FIGS. 2-5 the control system server (11) can be an integral part of the social network (8) to not only conduct the preferred procedures of the present invention but also the general procedures of a typical social network, e.g. storing user data, routing communications etc.

Figure 6:
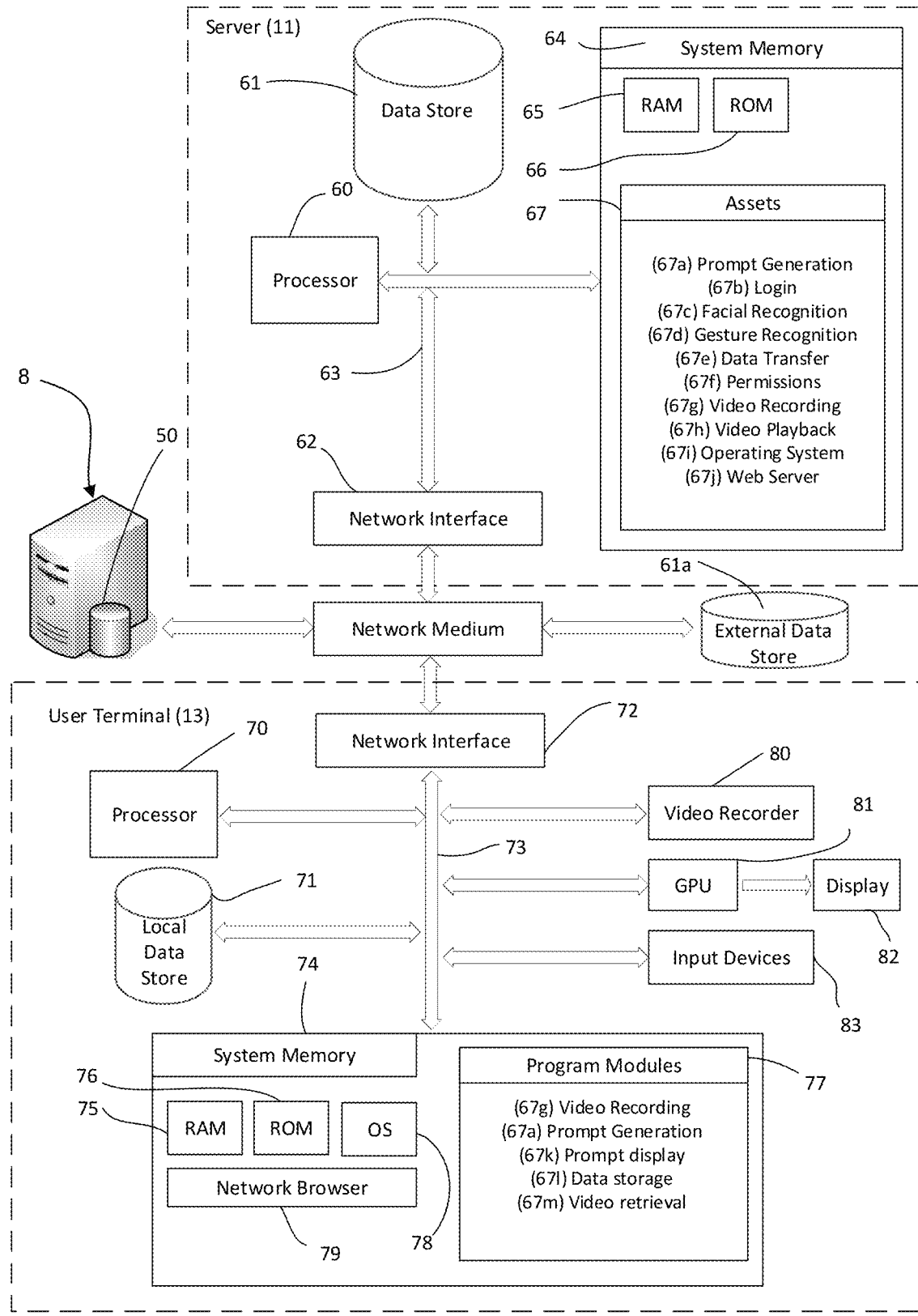
FIG. 6 shows a schematic logic diagram of a network control system according to another embodiment of the present invention.

However, in another preferred embodiment of the present invention as shown in FIG. 6, the social network (8) may operate independently to the server (11). The server (11) instead acts as a proxy between the user terminals (13, 14) and social network (8). Acting as a proxy allows the server (11) to control access to the social network (8) and information passed between the user terminals (13, 14) and social network (8) without being required to operate the social network (8) itself.

The server (11) functioning as a proxy server will operate as described above with respect to FIGS. 2-5, though it will be appreciated additional program modules may be needed to control transmission to and from the social network (8), intercept data and HTML and extract user information (e.g. a user's contact list) from the social network (8).

In operation, the embodiment of FIG. 6 operates using substantially the same method as shown in FIGS. 3-5, i.e. on receiving an access request from an entity (15) or assessing user (16) at user terminals (13, 14) the server (11) may present the entity (15) with the login screen to social network (8). If the correct credentials are entered the server (11) retrieves at least one identifying characteristic and optionally other details from the accessed user account on the social network (8) and passes to the user terminal (13). The identifying characteristics include name, gender, age, profile image, location, nationality, occupation. Other details may include profile information, contact list, personal interests, memberships and the like. The entity (15) making access is then able to access the social network information as per a direct access, except for where the entity (15) wants to communicate or share information with another user of social network (8) (or vice versa) and the entity (15) does not have a corresponding video recording (21) as determined by server (11).

When the server (11) determines an access request is made by an entity (15) without a corresponding video recording (21) the server (11) may restrict access or communication on the social network (8) by intercepting the HTML from the social network (8) and modifying it to warn any other user, e.g. assessing user (16), that the entity (15) does not have a video recording (21). The entity (15) is then prompted to go through the process (106)-(112) as shown in FIG. 3 and then be assessed by the assessing user (16) as per the process of FIG. 4.

The server (11) may also apply the same access and communication restrictions as described with respect to the earlier embodiments if assessments with respect to an entity accessing a particular accessed user account are negative, e.g. marking user as suspicious, restricting communication, generating warning notifications and the like.

Also with respect to FIG. 6, another alternative embodiment is described where the entity assessment methods (100b, 100c) may be implemented via a software application such as a network browser extension or plugin, i.e. the server (11) does not act as a proxy but is linked to network browser (79) on the user terminals (13, 14). When the network browser (79) communicates an access request to social network (8) from an entity (15) or assessing user (16) at user terminals (13, 14 respectively) the network browser (79) may present the entity (15) with a login screen to server (11) which also provides access to the social network (8) if credentials matching a registered user's account are entered. If the correct credentials are entered the server (11) passes correct login details to the social network (8) via browser (79) and retrieves the social network HTML as per a direct access to the accessed user account. The entity (15) is then able to access the social network information as per a direct access except instances where the entity (15) wants to communicate or share information with another user of social network (8) (or vice versa) and the entity (15) does not have a corresponding video recording (21) as determined by the server (11). When such an access request is made by an entity (15) without a corresponding video recording, the browser (79) may restrict access or communication on the social network (8) by intercepting and storing data sent from that entity (15) until that entity (15) has performed the method steps (106)-(112) as shown in FIG. 3 and been assessed as per the method (100b) of FIG. 4.

The browser (79) may also apply the same access and communication restrictions as described with respect to the earlier embodiments if assessments with respect to a particular user are negative, e.g. marking user as suspicious, restricting communication, generating warning notifications and the like. By way of example, parents may install such an application or browser extension on their child's computer to prevent direct access to specific social networks (8).

The embodiments illustrated with reference to FIG. 6 thereby allow interaction on the social network (8) without requiring the server (11) be integrated with the social network (8) while helping to ensure that imposters are identified and assessing users are confident of the identity, or at least appearance of the entity they are communicating with.

The embodiments of FIG. 6 are particularly useful where the social network (8) does not implement the entity assessment methods (100) of the present invention but the users (15, 16) still want to receive the benefits of using such an entity assessment method (100).

FIGS. 7-9 show the data network (10) with an internet social network (8) or relationship facilitation service (e.g. "dating website") with which the method of entity assessment according to one aspect of the present invention (shown in flow-chart form in FIGS. 3-5) can be implemented.

FIG. 7 shows an entity (15) being prompted with a sequence of three unpredictable prompts (18) to perform three visible actions (20) in the form of "smile", "unhappy" and "tongue out". A dashed arrow labelled "T" indicates the passage of time between prompts (18) or actions (20). The prompts (18) are displayed individually for a predetermined length of time, e.g. seven seconds. The entity (15) is asked to perform the actions (20) as the prompts are displayed (18) and the webcam (17) at first user terminal (13) simultaneously records the prompted action performance of the entity (15). The recording (21) is then stored and served to an assessing user (16) at second user terminal (14) who is able to view and assess the recording (21) as displayed at the second user terminal (14). FIG. 7 shows the circumstance where the entity (15) performs the correct actions in the correct sequence and thus the assessing user (16) is able to assess the entity (15) positively as having preformed the correct actions in the correct sequence.

FIG. 8 provides the same initial situation as in FIG. 7 but no recording (21) is provided to the assessing user (16) which results in the assessing user (16) providing an "inconclusive" or "negative" assessment as they are unable to view the entity (15).

FIG. 9 also provides the initial situation as in FIG. 7 but the entity (15) has performed the prompted actions (20) in an incorrect sequence. The assessing user (16) may thus assess the entity (15) negatively and choose not to communicate with the entity (15). An example of the video capture screen (53) and a single prompt (18) is shown in FIG. 10a. The entity (15) is also able to review a playback of their video recording and can repeat the recoding process if unsatisfied with the recording.

The server (11) configured for either methods 100b or 100c, may also be programmed to determine if a sufficient number of users provide negative assessments of the video recordings provided by the entity (15). The server (11) then will classify the accessed user account negatively, e.g. 'suspicious'. Depending on various configurations, the entity (15) may be logged out, the accessed user account suspended or other users (e.g. other members of internet dating services) can be warned that the entity (15) corresponding to the accessed user account is suspicious. In one embodiment vulnerable users, e.g. children, could be blocked from interacting with any entity (15) communicating from the accessed user account.

Thus, the aforementioned method may help identify imposters or other suspicious behaviour by providing a means for users to identify each other and note anything suspicious, thereby providing a greatly enhanced assessment system and moving the burden of advanced authentication from the network provider to the users of the network.

It will be appreciated that the aforementioned methods may differ in numerous ways without departing from the scope of the invention.

By way of example only, the video login steps (109-111) may be required at one, or multiple, or each:

- access request, including where user credentials are stored in cookies on the first user terminal;
- access request where the entity (15) or other user must enter access credentials.
- access request where the IP address of the first user terminal changes.
- access request where the physical login location of the first user terminal changes. This may be detected based on IP address, GPS, cellular network location detection methods of the first user terminal.
- $n^{th}$ access request, per week or other time-frame.

In another example, if a particular assessing user (B) positively assesses (122) an entity (A) a predetermined number of times while a predetermined number of other users negatively (124) assess user (A), then the server (11) may store a record in the assessing user's account that assessing user (B) is classified negatively and may be suspicious, i.e. assessing user (B) may be attempting to falsely positively assess user (A).

Conversely, if an assessing user (B) provides a predetermined number of negative assessments of an entity (A) while a predetermined number of other users provide positive assessments, then the server (11) may store a record in assessing user (B)'s account that assessing user (B) may be suspicious, i.e. user (B) may be falsely attempting to prevent entity (A) from becoming positively assessed and communicating on the communication network.

Figure 10B:
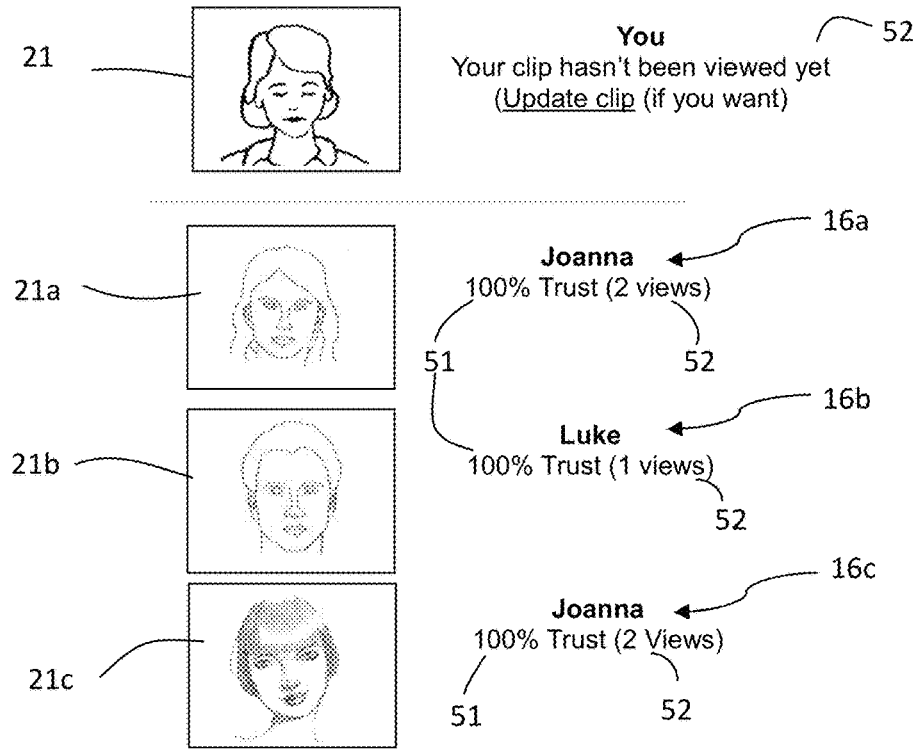
FIG. 10b shows a screenshot of a user profile and their friends in one example of the method of 'peer assessment' of FIGS. 3 and 4.

The ratio of positive to negative assessments from an assessing user (16) and/or other users in relation to a particular entity (15) can be used not only as feedback on the validity of the entity (15) but also, potentially as feedback on the validity of the assessing user (16). The entity (15) and/or assessing user (16) may thus be assigned an assessment rating based on the ratio of positive to negative assessments made. As shown in FIG. 10b, this assessment rating (51) (shown as a % value) can be displayed on the web-page next to the profile picture of the corresponding user account. FIG. 10b also shows an example image of the video recording (21) of the entity (15) and details of the other users accessible to the entity (15) i.e. assessing user (16a) and their contacts (16b, 16c) along with the first frame of their respective assessment recordings (21a, 21b, 21c). The entity (15) can view their contacts' (16a, 16b, 16c) recordings (21a, 21b, 21c) by clicking on the still images (21a, 21b, 21c). An assessment rating (51) is displayed for each user (16) and the total number of assessments (52) is also displayed.

FIG. 10b may also form part of a first user's 'friends page' on a social network (8) such that the entity (15) (labelled "you") is able to easily view the assessment ratings (51) of the contacts recorded against the accessed user account as well as take the role of assessing user (16) in the assessment method (100a-b) to assess those contacts (16a, 16b, 16c). Similarly, the contacts (16a, 16b, 16c) will be able to view the entity's recording (21) to assess the entity (15).

Figure 11:
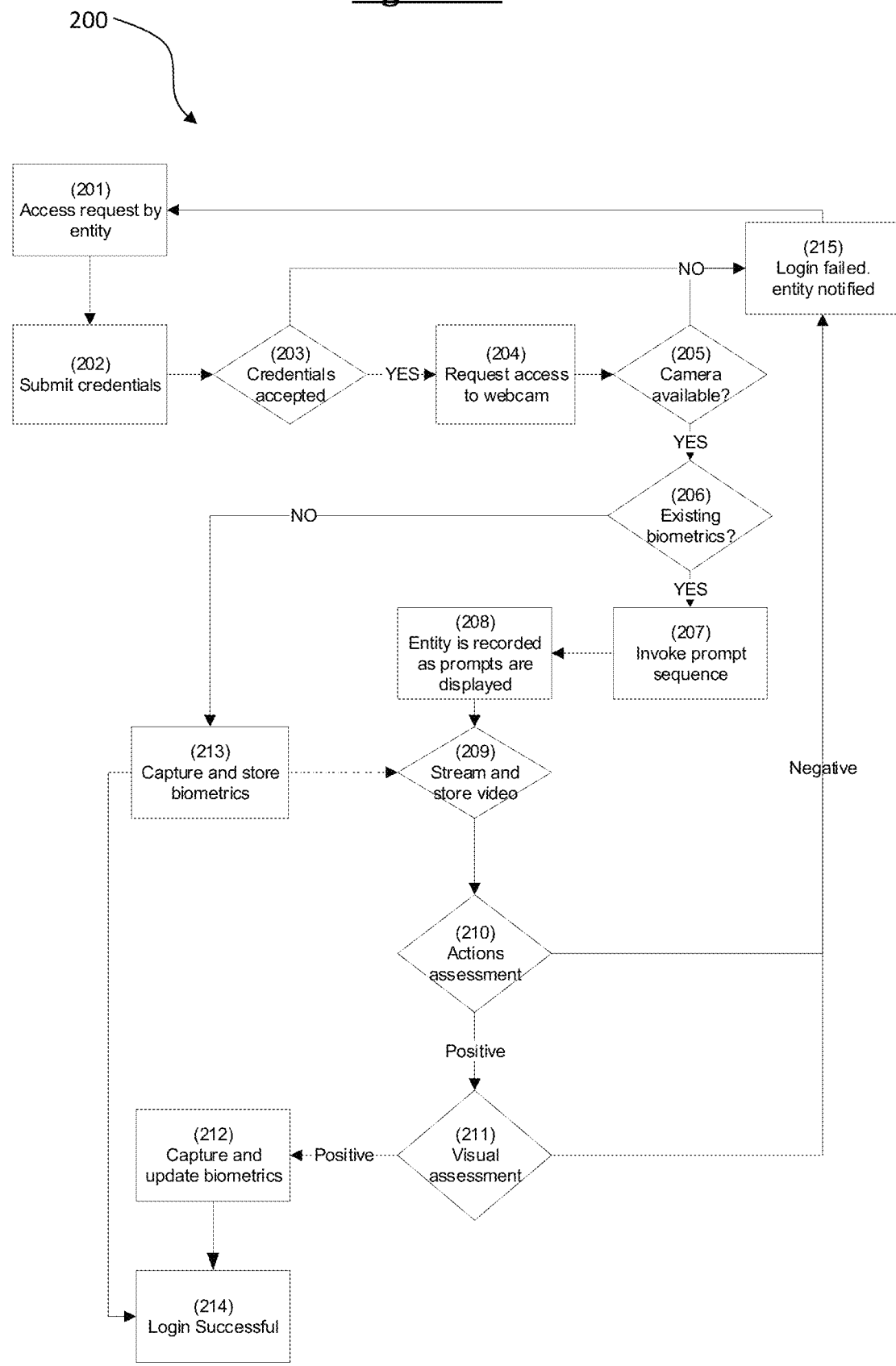
FIG. 11 shows a high-level flowchart representing an automated method of entity assessment according to a second preferred embodiment.

FIG. 11 shows a process flowchart (200) of an automated entity assessment method according to another preferred embodiment the present invention. This method (200) uses an automated face and gesture recognition system (not shown) instead of the assessing user (16) in the method shown in FIGS. 4-5. The method (200) generally uses comparable hardware as shown in FIG. 2 but with the further inclusion of gesture and face recognition software and necessary hardware, e.g. dual cameras, infrared illumination system and the like.

Such face and gesture recognition systems are well-known in the art and will not be described in further detail herein, except to state that the face recognition system needs to be capable of analyzing human facial features to compare with a reference source such as a video, image or biometric data. A match is determined if the correlation between the face detected and the reference source is sufficient. The gesture recognition system needs to be capable of detecting human facial and/or body gestures. An example of a suitable facial and gesture recognition system is the Microsoft™ Kinect™ system. The gesture recognition system may alternatively use additional apparatus, e.g. a traceable item that the user performs the gestures with. The traceable item thus negates the need for the gesture recognition system to recognize human body parts.

The method, system and software of the second embodiment (200) may also be used on proprietary hardware, e.g. the first user terminal (13) may be a kiosk, security door, banking ATM, mobile phone, or other device capable of accessing a data network.

In general the aforesaid second embodiment (shown in FIG. 11) involves the following steps:

(step 201) Receiving an access request from an entity (15) from a first user terminal (13) for access to a user account on the data network (10).

(step 202) The access request includes an initial "login" request (201) with submission of credentials including a user ID and password. A database (50) of user accounts is queried to identify a user account with a matching user ID.

(step 203) The server (11) receives the submitted credentials and determines if they match the credentials as indicated by the accessed user account, and/or whether the user ID entered matches any user account in the database (50). If the credentials don't match, the login fails and the entity (15) is notified that the login has failed (215). The entity (15) is then returned to repeat the login process (201).

(step 204) If the credentials do match, the initial login is read as a success. The next step (205) involves sending a request to the first user terminal (13) to access a webcam (17) or other recording device. This request may be in the form of a Flash™ application, remote method invocation, an HTTP GET/POST request (a URL request), an application specific request or similar. Alternatively, the entity (15) may be required to install software on the first user terminal (13) which then accesses the webcam (17) on behalf of the server (11). The webcam (17) is preferably controlled by the software or web server (11) to prevent pre-recordings being provided to the server (11) in place of a 'live' webcam recording.

(step 205) The request is then processed by the first user terminal (13) and a reply sent to the server (11) indicating whether the first user terminal (13) has a video recording device (17).

If a video recording device (17) is not available, the access request fails (215) and the entity (15) is denied access to the data network (10), or only permitted restricted access.

(step 206) If a video recording device (17) is available, the control system (11) accesses the accessed user account and queries the existence of pre-recorded biometrics extracted from a calibration process (213) that analyses the face and gesture biometrics of the registered user of the accessed user account when first registering. If no pre-recording exists the entity (15) is treated as the registered user and is asked to perform the calibration procedure (213) after step (206).

(step 207) If the control system (11) locates existing biometrics a sequence of unpredictable prompts is invoked and the first of three unpredictable prompts (18) is displayed on the first user terminal (13) to ask the entity (15) to perform a visible action (20), e.g. as described with respect to the first embodiment (100).

(step 208) The video recording device (17) then records the entity (15) performing the first prompted action (20).

(step 209) The server (11) repeats steps (207 and 208) with a random time delay between each prompt (18) until three prompts (18) have been provided and recorded.

(step 210) The recording is then analysed using the gesture recognition system. If the actions (20) performed by the entity (15) match reference gestures correlating to the prompts (18) provided and were performed in the correct sequence, then a positive assessment signal is generated for the Actions assessment (210) indicating the actions (20) were performed correctly. If an action (20) is recorded that does not match the corresponding prompt (18) or an action (20) is recorded out of sequence then a negative assessment signal is generated for the Actions assessment (210) indicating the prompted actions were performed incorrectly and the login request is denied (215).

(step 211) The recording is then analysed using the facial recognition system. If the face of the entity (15) in the recording (21) surpasses a threshold level of correlation to identifying characteristics (e.g. the reference biometrics) stored in the database (50) then a positive assessment signal is generated indicating the entity (15) is visually assessed positively as correlating to the accessed user account.

(step 212) The system also captures and updates the reference biometrics if a positive classification is made.

(step 213) The calibration process (213) may involve two sub-procedures (not shown in FIG. 11), namely:

Requesting the entity (15) present their face to the video recording device (17) from varying angles and with various expressions. These reference videos are analysed by a face recognition algorithm to extract face biometrics/parameters, e.g. distance between eyes, nose size etc. These biometrics and the video are stored in the database (50) in the accessed user account, and prompting the entity (15) to perform a series of gestures which are analysed using a gesture recognition algorithm to create reference gesture parameters that are stored in the database (50) in the first user's account record.

After the calibration procedure (214) the entity (15) is logged into the data network.

(step 214) The entity is logged into the network (10) and provided access to the corresponding user account if the entity's (15) face and visible actions are assessed positively with respect to reference biometrics stored in the accessed user account.

The entity (15) is logged in (provided access) to the network (10):
after the calibration procedure (213); or
upon positive actions and visual assessments (210-211)

(step 215) As described above, the entity (15) is denied access if the server (11) makes:
incorrect credentials received;
no video recording device present;
a negative actions assessment;
a negative visual assessment.

The aforementioned method (200) provides an automated system of entity assessment that does not rely on an assessing user (16) to assess the entity (15). The use of facial and gesture recognition systems instead of an assessing user may thus prove useful in many applications where an entity does not wish to, or is not required to, provide video to other users but requires access to the data network (10), e.g. as previously mentioned, applications such as banking logins and so forth.

In a further embodiment, the facial recognition system may also be configured to analyse the face biometrics of the recorded entity and generate a "TAMPERED VIDEO" signal if the analysis indicates rapid changes in particular biometrics (e.g. distance between eyes) during the recording. Such changes may indicate a false video that is generated from multiple recordings 'stitched' together.

In a further embodiment (not shown) the method (200) may be used to access a user terminal (13, 14), i.e. rather than accessing the data network (10) directly, the assessment method (200) may be used to access the user terminal (13, 14). Subsequently the user terminal (13, 14) is therefore able to freely access the data network (10) or a further assessment process (100, 200) performed in order to gain access to the network (10).

In an alternative embodiment to the login steps (202) to (203), the server (11) may conduct steps to capture a video or image of the entity (15) and run the facial recognition algorithm (67c) to identify user accounts in database (50) with matching biometric data, if matching data is found the entity (15) may be automatically logged in to access the corresponding user account, thereby obviating the need to supply username and password credentials. Alternatively, the server (11) may run steps (207) to (210) and use the video recording captured to not only identify user accounts in database (50) with matching biometric data but also to determine of the actions were performed 'validly'. Thus the entity can be 'logged-in' while also having their prompted actions assessed.

Aspects of the present invention have been described by way of example only and it should be appreciated that modifications and additions may be made thereto without departing from the scope of the claims.

The invention claimed is:

1. A method of assessing an entity at a first user terminal, the method using a control system including a gesture recognition system and a facial recognition system, the control system operable to perform the method of assessing an entity, the method including:
   invoking or facilitating transmission of at least one unpredictable challenge prompt to said entity for prompting a performance of a corresponding visible prompted response action;
   capturing at least one video recording of the entity's performance,
   performing an automated assessment of said recording using the gesture recognition system and facial recognition system,
   generating one or more assessment signals indicative of said assessment,
   wherein said automated assessment includes assessment by the gesture recognition system and facial recognition system, the one or more assessment signals respectively indicating a positive or negative determination of whether or not the entity validly performed at least one of the prompted actions.

2. The method as claimed in claim 1, wherein the entity is communicating on a data network via a first user terminal connected to the data network, wherein the data network includes one or more user records collectively forming a "user account" in a database in a data store accessible by a control system and wherein the user account includes a set of identifying characteristics relating to a registered user, the method utilising a control system operable to perform the steps of:
   a) receiving an access request from at least one of: the entity or an assessing user at a second user terminal connected to the data network;
   b) invoking or facilitating transmission of the at least one unpredictable prompt to the entity for a performance of the corresponding response action, the transmission invoked by providing computer-executable code or computer-readable data to software on the first user terminal.

3. The method as claimed in claim 1 wherein the facial recognition or gesture recognition system utilises anatomical geometry recognition as part of the assessment.

4. The method as claimed in claim 2, wherein the data network includes a "virtual network" formed from connections between multiple users connected to the data network, said virtual network embodied in related data records in a database, each data record corresponding to a registered user or a user terminal.

5. The method as claimed in claim 2, wherein a sequence of at least two said unpredictable prompts are provided for the entity to perform corresponding response actions.

6. The method as claimed in claim 5, wherein, the prompts are provided to the entity with a time delay between each prompt, the time delays between each prompt being selected from the range between zero seconds and five seconds.

7. The method of claim 2, including the further step of c) invoking or facilitating transmission of the video recording from said first user terminal and details of said prompt to a second user terminal for viewing and assessment by an assessing user at a second user terminal connected to the data network.

8. The method as claimed in claim 7, wherein steps b) and c) include invoking storage of the video recording in memory for streaming over the data network to the second user terminal.

9. The method as claimed in claim 1, wherein said prompts describe, portray or relate to the actions to be performed.

10. The method as claimed in claim 2, wherein a data store for storing the recording is provided separately to a user data store containing a database of user account records.

11. The method as claimed in claim 1, wherein the prompt includes an instruction to perform movements or gestures of the eyes.

12. The method as claimed in claim 11, wherein the method includes instructing the entity to look at a user interface element on a display and the prompt includes a change in displayed position of the user interface element on the display.

13. The method as claimed in claim 1, wherein the control system includes one or more additional user identification systems selected from the group including:
fingerprint scanner
iris scanner
fingerprint identification
hand geometry
palm vein authentication
retina scanner
voice recognition system
any combination or permutation of the above.

14. The method as claimed in claim 1, wherein the video recording is a live-stream temporarily recorded in a storage medium.

15. The method as claimed in claim 1, wherein the control system performs said method upon receiving an access request, the access request including a request to make a purchase or sale of a good or service.

16. The method as claimed in claim 1, wherein the first user terminal includes the control system.

17. The method as claimed in claim 1, wherein the first user terminal is a mobile computing device.

18. The method as claimed in claim 1, wherein the recording and prompt collectively comprise a digital signature indicating acceptance of a contract.

19. The method as claimed in claim 18 wherein the contract includes an accommodation contract.

20. The method as claimed in claim 5, wherein the assessment is conducted after each individual prompt and corresponding recording.

* * * * *